US007664669B1

(12) United States Patent
Adams et al.

(10) Patent No.: US 7,664,669 B1
(45) Date of Patent: *Feb. 16, 2010

(54) METHODS AND SYSTEMS FOR DISTRIBUTING INFORMATION WITHIN A DYNAMICALLY DEFINED COMMUNITY

(75) Inventors: Warren Adams, Edgartown, MA (US); Kenneth L. Dinovo, Cambridge, MA (US); Michael McDaniel, Seattle, WA (US); Ryan J. Snodgrass, Kirkland, WA (US); Brian Robertson, Boston, MA (US); Jennifer A. Jacobi, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 2088 days.

This patent is subject to a terminal disclaimer.

(21) Appl. No.: 09/715,929

(22) Filed: Nov. 17, 2000

Related U.S. Application Data

(60) Provisional application No. 60/166,547, filed on Nov. 19, 1999, provisional application No. 60/166,664, filed on Nov. 19, 1999.

(51) Int. Cl.
*G06F 17/30* (2006.01)
(52) U.S. Cl. ..................................................... 705/10
(58) Field of Classification Search .................. 705/10, 705/14
See application file for complete search history.

(56) References Cited

U.S. PATENT DOCUMENTS 4,992,940 A 2/1991 Dworkin
5,796,395 A 8/1998 de Hond
5,884,282 A 3/1999 Robinson
5,913,032 A 6/1999 Schwartz
5,918,014 A 6/1999 Robinson
5,974,396 A 10/1999 Anderson et al.
6,029,141 A 2/2000 Bezos et al.
6,041,311 A 3/2000 Chislenko et al.
6,092,049 A 7/2000 Chislenko et al.
6,175,831 B1 1/2001 Weinreich et al.
6,249,773 B1 6/2001 Allard et al.
6,269,369 B1 7/2001 Robertson
6,317,722 B1 11/2001 Jacobi et al.
6,321,221 B1 11/2001 Bieganski (Continued)

FOREIGN PATENT DOCUMENTS

WO    WO 99/23591    5/1999

(Continued)

OTHER PUBLICATIONS

"Home, Netscape, Yahoo! Veterans Announce Epinions.com." PR Newswire, p. 8921, Jul. 12, 1999.*

(Continued)

*Primary Examiner*—Susanna M Diaz
(74) *Attorney, Agent, or Firm*—Knobbe, Martens, Olson & Bear LLP

(57) ABSTRACT

One embodiment of the present invention distributes data via a network to remotely located individuals. Evaluation feedback by one or more of the individuals is transmitted to others so that the feedback may be used by others to quickly locate the more useful data. The evaluation feedback may be in the form of ratings of product reviews. The feedback helps customers by allowing the more useful reviews can be quickly located.

19 Claims, 19 Drawing Sheets

U.S. PATENT DOCUMENTS

| | | | |
|---|---|---|---|
| 6,460,036 | B1 | 10/2002 | Herz |
| 6,473,738 | B1 | 10/2002 | Garrett |
| 6,513,033 | B1* | 1/2003 | Trauring ........................ 707/3 |
| 6,525,747 | B1 | 2/2003 | Bezos |
| 6,611,814 | B1 | 8/2003 | Lee et al. |
| 2002/0023132 | A1 | 2/2002 | Torabene |
| 2002/0042775 | A1 | 4/2002 | Nelson et al. |
| 2002/0095298 | A1 | 7/2002 | Ewing |
| 2002/0165905 | A1* | 11/2002 | Wilson ....................... 709/203 |
| 2003/0074265 | A1 | 4/2003 | Oshima |
| 2004/0172588 | A1 | 9/2004 | Mattaway |

FOREIGN PATENT DOCUMENTS

| | | |
|---|---|---|
| WO | WO 00/62223 | 10/2000 |
| WO | WO 01/15002 A2 | 3/2001 |

OTHER PUBLICATIONS

"Epinions.com Announces the Launch of its Free Online Shopping Guide Powered by Consumer Opinions." PR Newswire, p. 2829, Sep. 8, 1999.*

Tedeschi, Bob. "Consumer Products Are Being Reviewed on More Web Sites, Some Featuring Comments from Anyone with an Opinion." New York Times, sec C, p. 16, col. 1, Oct. 25, 1999.*

Barrett, Alexandra. "What's Your Epinion?" Network World, p. NA, Sep. 13, 1999.*

Tedeschi, Bob. "Consumer Products are Being Reviewed on More Web Sites, Some Featuring Comments From Anyone With an Opinion." (Full Text Version) New York Times, Late Edition—Final ED, col. 1, p. 16, Oct. 25, 1999.*

Wohl, Amy. "User Review—Your Opinions Are Highly Valued on the Web." VarBusiness, No. 1528, p. 69, Nov. 8, 1999.*

"eBay Launches the Most Comprehensive Trust and Safety Upgrades to the World's Largest Person-to-Person Trading Site." PR Newswire, Jan. 15, 1999.*

Lenatti, Chuck. "Auction Mania." Upside, vol. 11, No. 7, pp. 84-92, Jul. 1999.* eBay's Feedback Forum web site, archived on Oct. 12, 1999 by web.archive.org [URL: http://web.archive.org/web/19991012065814/pages.ebay.com/...].*

D. Willmott, "Deja View," PC Magazine Online, dated May 26, 1999 (2 pages).

M. Rafter, "Companies to Watch: Epinions.Com," The Industry Standard Magazine, dated Jan. 17, 2000 (3 pages printed from TheStandard.com web site).

D. Willmott, "epinions.com," PC Magazine, dated Sep. 10, 1999 (2 pages printed from zdnet.com web site).

A. Barrett, "What's Your Epinion?", PC World, Sep. 13, 1999 (2 pages printed from PCWORLD.COM Web Site).

C. Kirby, "Everyone's A Critic—Web sites Hope online reviews of products lead to online buying," San Francisco Chronicle, Jan. 22, 2000 (3 pages printed from sfgate.com web site).

W. Andrews, "Building Communities As Way of Building Sales," Web Week, vol. 2, Issue 20, Dec. 16, 1996 (2 pages).

M. Roscheisen, C. Mogensen and T. Winograd, "Beyond browsing: shared comments, SOAPs, trails, and on-line communities," Computer Networks and ISDN Systems, Proceedings of the Third International World-Wide Web Conference, pp. 739-749, dated Apr. 1995.

Abstract: "Just Add People—Collaborative filtering brings human input to information retrieval in the enterprise".

Watt, Peggy; Internet Article; "Varied Collaborative Approaches Entice Intranet Users," Network World, Apr. 21, 1997; Proquest #11525439.

PlanetAll; Cardwell, Annette; "CYBERSCENE PlanetAll Keeps You in Touch," Boston Herald, Dec. 6, 1996, Proquest #17350285.

PlanetAll: Internet Archive Wayback Machine, www.archive.org; www.planetall.com; Nov. 14, 1997, 19pgs.

Amazon: Paquet, Cheri; "Amazon.com Buys Junglee and PlanetAll," PC World Online, Aug. 5, 1998, Proquest #58947830.

Amazon: Weil, Nancy; "PlanetAll Keeps Online Masses Organized," PC World Online, Aug. 14, 1998, Proquest #33761930.

UU: Carrol, Matt: "Can't Keep Track of Your Friends? A Cambridge Firm Will," Boston Globe, Jan. 4, 1998, Proquest #25464125.

U.S. Appl. No. 09/715,850, filed Nov. 17, 2000, Adams, et al. (U.S Pending Application).

"MyGiftList.com Announces Launch of Online Gift Registry" Dec. 1999, Business Wire.

Specification of U.S. Appl. No. 09/718,445, filed Nov. 20, 2000.

Epinions.com, www.epinions.com, Dec. 4, 1999 [retrieved May 17, 2004], pp. 1021, retrieved from: Google.com and archive.org.

Epinions.com, www.epinions.com, Dec. 4, 1999[retrieved May 17, 2004], pp. 1021, retrieved from: Google.com and archive.org.

* cited by examiner amazon.com | YOUR ACCOUNT | HELP

TODAY'S FEATURED STORES

WELCOME | DIRECTORY | BOOKS | ELECTRONICS | AUCTIONS | HEALTH & BEAUTY | TOYS & GAMES

HOW TO ORDER | GIFT IDEAS | TOP SELLERS | FRIENDS & FAVORITES | FREE E-CARDS

Friends & Favorites > Your About You Area > Edit your personal description

Who Are You?

This is your chance to share a bit about yourself (4,000 characters or less). Have fun.

Describe yourself: [ I like to read history-related books and novels. ]

(All personal descriptions are automatically public.)

(Submit)

Not sure what to say? Let these questions help you get started:

o Where do you live?
o What you do for work? For fun?
o What's your all-time favorite movie or book?
o What are your passions? Your pet peeves?
o If someone handed you an Amazon.com gift certificate, what would you buy?
o If you had a month off——no work, no responsibilities——what would you do?

Guidelines: Learn more about the ins and outs of Friends & Favorites.

*FIG. 1B*

FIG. 3A amazon.com

| AUCTIONS | ART & COLLECTIBLES | zSHOPS | KITCHEN | LAWN & PATIO | TOOLS & HARDWARE |

HELP | YOUR ACCOUNT

| WELCOME | BOOKS | MUSIC | DVD & VIDEO | ELECTRONICS | SOFTWARE | TOYS & VIDEO GAMES | HEALTH & BEAUTY | HOME LIVING |

| HOW TO ORDER | GIFT IDEAS | TOP SELLERS | FRIENDS & FAVORITES | FREE E-CARDS |

SEARCH
PEOPLE ▽
[  ]
GO!

EXPLORE
- Your About You Area
- Wish List
- Purchase Circles
- Discussion Boards
- Top Reviewers
- Refer-A-Friend
- Free e-Cards
- Add a Reminder your FAVORITE PEOPLE
All Favorite People
  Doug Vaughn
Favorite People list [Edit]

Manage Your Friends & Favorites
- Edit Your About You Area
- Add/Edit Shared Purchases
- Manage Favorite People List
- Add Trusted Friends

WELCOME TO Friends & Favorites

Welcome, John Example! (if you're not John Example, click here.)

You've already added names to your Favorite People list. Now add some more! Find people you know using the Search box located on this page. Go to Amazon.com's Top Reviewers page and track down reviewers whose opinions you respect. Be sure to update your About You area so that people can get to know you.

Doug Vaughn recently reviewed:

[BOOK COVER ART] ⓘ Tides of War: A Novel of Alcibiades and the Peloponnesian War
by Steven Pressfield

Doug Vaughn's Rating and Review
★★★★★ If it weren't true it would be hard to believe Those who have read Pressfield's previous book, Gates of Fire, will have a hard time recognizing this novel as being the same author's work. Whereas that one was focused on a single battle and thus had a limited time and place imposed on the action, Tides of War deals with the entire Peloponnesian war (all 27 years) and is all over the place in both time and location. One problem, for sure, is that many readers will be the 'voice' of the story. It is told by someone who gets it from his grandfather... see entire review In the Newport Beach, Ca Purchase Circle:

[BOOK COVER ART] ⓘ The Power Game : How Washington Works
by Hedrick Smith

▸ See more unique Newport Beach, CA bestsellers your PARTICIPATION
Favorite People: 1
Shared Purchases: 0
Items on Wish List: 1 top REVIEWERS

3 Angel Lee

[PHOTO] Reviews written: 256
Helpful votes: 1976

4 Donald W. Mitchell

[PHOTO] Reviews written: 372
Helpful votes: 2840

▸ See the Top Reviewers List

Have feedback or suggestions? Share them with us now.

Guidelines: Learn more about the ins and outs of Friends & Favorites

---

Friends & Favorites | Top Reviewers | Purchase Circles | Discussion Boards | Refer-A-Friend | Free e-Cards

*FIG. 3B* amazon.com

| | | AUCTIONS | ART & COLLECTIBLES | zSHOPS | KITCHEN | LAWN & PATIO | TOOLS & HARDWARE | 🛒 \| HELP |
|---|---|---|---|---|---|---|---|---|
| | | | | | | | | YOUR ACCOUNT |

| WELCOME | BOOKS | MUSIC | DVD & VIDEO | ELECTRONICS | SOFTWARE | TOYS & VIDEO GAMES | HEALTH & BEAUTY | HOME LIVING |

| ADVANCED SEARCH | BROWSE GENRES | TOP SELLERS | NEW & FUTURE RELEASES | DVD | KIDS & FAMILY | AWARDS & RECOMMENDATIONS |

---

SEARCH

[DVD ▽]

[____] (GO)

DVD INFORMATION

Explore This DVD
- buying info
- technical information
- cast list
- quotes & trivia
- editorial reviews
- customer reviews See more by the cast & directors
- Julie Andrews
- Dick Van Dyke
- Robert Stevenson (I)

Customers also bought
- these Videos
- these other items

Share your thoughts
- e-mail a friend about this DVD

Visit the Music Store

[ALBUM COVER ART]

The Sound Of Music
~Richard Rodgers, Oscar Hammerstein II

---

Mary Poppins (1964)

[DVD COVER ART]

List Price: ~~$29.99~~
Our Price: $19.49
You Save: $10.50 (35%)

Release Date: July 4, 2000. You may still order this title. We will ship it to you as soon as it is available

READY TO BUY?

PRE-ORDER THIS ITEM TODAY
(you can always cancel it later)

🔒 Shopping with us is 100% safe. Guaranteed.

Add to my Wish List
(We'll set one up for you)
View my Wish List

DVD
Rated: G
Starring: Julie Andrews, Dick Van Dyke, et al.
Director: Robert Stevenson (I)

Edition Details:
- Region 1 encoding (US and Canada only)
- Color, Animated
- The Making of "Mary Poppins"
- Widescreen anamorphic format
- ASIN: 6305878323 Click here for more technical details about this edition...

Other Formats: VHS, DVD
Amazon.com Sales Rank (DVD): 86

---

Customers who bought this DVD also bought:
- Annie (November 7, 1999) VHS; Clamshell
- Pete's Dragon (November 3, 1977)~Helen Reddy; VHS; Clamshell
- Toy Story (November 22, 1995)~Tom Hanks; VHS; Clamshell Click here for more suggestions...

Auctions and zShops sellers and our other stores recommend:
- Dick Van Dyke~Mary Poppins 8x10 Photo (Price: $6.99)

---

Customer Reviews of the Day (what's this?)
Write an online review and share your thoughts with other viewers!

5 of 5 people found the following review helpful:
★★★★★ Is it impossible to make films like this anymore?     July 3, 1999
Reviewer: A viewer from Deltona, FL
This movie is now 35 years old. It is smart, funny, fresh and as limber as the day it was released in August of 1964.
Was this review helpful to you? (YES) (NO)

11 of 12 people found the following review helpful:
★★★★★ FANTASTIC FANTASY     January 7, 2000
TOP 50  Reviewer: Bob (see more about me)
Reviewer  To date, it is hard to think of a movie that intergrated story, charcter, musical numbers, animation and live action as enchantingly as Mary Poppins.
Was this review helpful to you? (YES) (NO)

---

Friends & Favorites | Top Reviewers | Purchase Circles | Discussion Boards | Refer-A-Friend |
                                       Free e-Cards

FIG. 4

8. What's an About You area?

Your About You area is the place at Amazon.com where others can learn more about you. You can do all sorts of things to spruce it up. Write a little blurb about yourself. Add your photo. Write a product review. Create a Wish List. There's even a private area of your About You area where you are able to share your purchases with Trusted Friends.

9. How do I turn off my About You area?

No problem. Please send e-mail to community-help@amazon.com and our customer service department will accomodate your request.

10. I've noticed a page with objectionable content. What should I do?

If you feel another person has creadted an About You Area that contains objectionable content, please send e-mail to community-help@amazon.com and we will investigate the ,matter promptly. You can read our full guidelines here.

11. What is purchase sharing?

Purchase sharing is your opportunity to share a list of your purchases (including personal ratings and comments for each) with your group of Trusted Friends. Your Shared Purchases page is the part of your About You area that shows your Amazon.com purchases, comments, and ratings. Unlike the other areas of your About You area, your Shared Purchases page can be accessed only bt the Trusted Friends that you invite or by anyone if you decide to make it public.

12. Why should I share my purchases?

Purchase sharing is a great tool for helping your Trusted Friends become better-informed consumers, and for letting them get to know you a little bit better. By sharing stories about purchases—great deals, regrets, must-haves, etc.—you and your Trusted Friends will be able to learn from your experiences and discover smarter, more effcient ways to shop.

13. How do I access someone else's Shared Purchases page?

If your friend hasn't made their Shared Purchases public you need an invitation. In this case you could wait to be invited by someone else, but we recommend that you take one of these more proactive approaches:

- Create your own Shared Purchases area, invite your friend, and encourage him or her to return the favor and invite you to his or hers Shared Purchase area.
- Add the person you want to be able to see your page to your group of Trusted Friends. As part of this process, he or she will receive an e-mail on your behalf inviting him or her to visit your Shared Purchases area.
- Call your friend, tell him or her about purchase sharing, and ask if s/he is interested in sharing information with you.

14. May I choose which purchases appear on my Shared Purchase page?

Definately. When you set up your Shared Purchases page, you decide which purchases you want to share with your friends and which ones you'd like to keep private. Each time you buy something new, we'll ask whether you want to add it to your Shared Purchses. If you change your mind, you can add and delete purchases, comments, and ratings from your Shared Purchases page atany time.

FIG. 9B

15. Who can access my Shared Purchases page?

Unless you make your Shared Purchases public only the people you invite as Trusted Friends will be able to access your Shared Purchases page at Amazon.com. When these people respond to your invitation, they become Trusted Friends on your Favorite People list. You'll know who these people are because they'll have a star next to their name when you view your Favorite People list. (You can add and delete names from your Trusted Friends list at any time.)

16. How does Amazon.com keep my purchase information secure?

We take customer privacy very seriously at Amazon.com. The people you've invited to be Trusted Friends are able to see your Shared Purchases page only if they are logged into Amazon.com's secure server and recognized in our database as your Trusted Friends. If for any reason you decide that you no longer want a person to have access to your purchase information, you can delete that person's name from your group of Trusted Friends, and he or she will no longer be able to access your Shared Purchases page.

Go back to the Friends & Favorites home page.

Friends & Favorites | Top Reviewers | Purchase Circles | Discussion Boards | Refer-A-Friend | Free e-Cards

Where's My Stuff?
- Track your recent orders.
- Use Your Account to view or change your orders.

Shipping & Returns
- See our Shipping Rates & Policies
- Read our Returns Policy

Need Help?
- Forgot your password? Click here.
- Redeem or buy a gift certificate.
- Visit the Help Desk.

Text Only      Top of Page

Amazon.com | Home | Books | Music | DVD | Video | Toys & Games | Electronics | Camera & Photo | Software | Computer & Video Games | New Cars | Kitchen | Tools & Hardware | Lawn & Patio | Health & Beauty | Auctions | zShops | e-Cards | 1-Click Settings
Shopping Cart | Your Account | Help | Sell Items International | Top Sellers | Friends & Favorites | e-Cards | Play Station2

Our Internationa Sites: United Kingdom, Germany, France

FIG. 9C amazon.com

Purchase Sharing
with Trusted Friends

Share your purchases with your Trusted Friends

Now you can connect with your Trusted Friends in a whole new way—by sharing your Amazon.com purchases. You'll find out things you never knew about each other. Passions, interests, and hobbies that never came up in conversation will pop up in your lists of purchases. So go ahead. Choose the purchases you'd like to share. Give your purchases a star rating. Add comments. Make this page an information-packed resource for your Trusted Friends.

What is the Rating Scale?

The buttons numbered 1-5 represent the following ratings:

- 1 ☆☆☆☆☆ Don't like it
- 2 ☆☆☆☆☆ Not for me
- 3 ☆☆☆☆☆ I like it
- 4 ☆☆☆☆☆ It's Great
- 5 ☆☆☆☆☆ I Love it!

Items 1 to 25 are shown below.

| Share Item: | Your Comments: | Not rated: | Your Star Rating: Don't like it ◁▷ love it! |
|---|---|---|---|
| ☐ Fiddler on the Roof<br>Mgm/Ua Studios | | ○ ? | ○ ○ ○ ○ ◉<br>1 2 3 4 5 |
| ☐ Mary Poppins<br>Disney Studios | Great Music | ○ ? | ○ ○ ○ ○ ○<br>1 2 3 4 5 |
| ☐ A Bug's Life<br>Disney Studios | Cutting edge animation | ○ ? | ○ ○ ○ ○ ○<br>1 2 3 4 5 |
| ☐ Gone With the Wind<br>Warner Home Video | | ○ ? | ○ ○ ○ ○ ○<br>1 2 3 4 5 |
| ☐ The Dark Crystal<br>Columbia/Tristar Studios | | ○ ? | ○ ○ ○ ○ ○<br>1 2 3 4 5 |
| ☐ Sesame Street's 25th Birthday – A Musical Celebration<br>Sony Wonder | My children love it | ○ ? | ○ ○ ○ ◉ ○<br>1 2 3 4 5 |
| ☐ The Jungle Book<br>Disney Studios | The best | ○ ? | ○ ○ ○ ○ ◉<br>1 2 3 4 5 |
| ☐ Wallace & Gromit: The First Three Adventures (1990-1995)<br>Twentieth Century Fox | | ○ ? | ○ ○ ○ ○ ◉<br>1 2 3 4 5 |
| ☐ Sesame Street – Elmopalooza!<br>Sony Wonder | | ○ ? | ○ ○ ○ ○ ○<br>1 2 3 4 5 |
| ☐ The Wiggles – Yummy Yummy<br>The Wiggles(Primary Contributor) | | ○ ? | ○ ○ ○ ○ ○<br>1 2 3 4 5 |

FIG. 10A

☐ Tarzan
Disney Studios

☐ The Wiggles – Wiggle Time
The Wiggles(Primary Contributor)

☐ Sesame Street – 1 2 3 Count With Me
Muppets(Primary Contributor)

☐ Little Bear; Meet Little Bear
Little Bear(Primary Contributor), Maurice Sendak (Primary Contributor)

☐ Best of Kermit on Sesame Street
Alice Dinnean(Actor), et al

○ ? ○1 ○2 ○3 ○4 ○5

(Save Changes)   (Continue)

Friends & Favorites | Top Reviewers | Purchase Circles | Discussion Boards | Refer–A–Friend | Free e–Cards

Where's My Stuff?
o Track your recent orders.
o Use Your Account to view or change your orders.

Shipping & Returns
o Get help redeeming a gift certificate
o Order a gift certificate

Need Help?
o Forgot your password? Click here.
o Visit the Help Desk.

Check out our new navigation and tell us what you think.

Text Only                                                                 Top of Page Amazon.com | Home | Books | Music | DVD | Video | Toys & Games | Electronics | Camera & Photo | Software | Computer & Video Games | New Cars | Kitchen | Tools & Hardware | Lawn & Patio | Health & Beauty | Auctions | zShops | e–Cards | 1–Click Settings
Shopping Cart | Your Account | Help | Sell Items Amazon.co.uk | Amazon.de

FIG. 10B amazon.com

| YOUR ACCOUNT | HELP |

WELCOME | DIRECTORY

TODAY'S FEATURED STORES: DVD | BOOKS | HEALTH & BEAUTY | zSHOPS | MUSIC

▷INTERENATIONAL | ▷TOP SELLERS | ▷FRIENDS & FAVORITES | ▷FREE E-CARDS | ▷PLAYSTATION2

Search People: [All ▽] [____] (GO)   Your Favorite People: [Select ▽] (GO)

Friends & Favorites > Your About You Area > Favorite People > Invite Trusted Friends

Trusted Friends are people who have permission to see a private view of your About You area. This private view can include personal information like name or e-mail and items from your list of Shared Purchases. Trusted Friends appear in your Favorite People list with a star icon text ti their name.

The people whose e-mail addresses you enter in the text box below will be notified of their Trusted Friend status and invited to visit your About You area.

Enter the e-mail addresses of the people you'd like to add as Trusted Friends

```
JohnDoe@example
```

Please seperate each address with a coma.
(e.g. janedoe@company.com, johndoe@school.edu, etc.)

(Add)

Friends & Favorites | Top Reviewers | Purchase Circles | Discussion Boards | Refer-A-Friend | Free e-Cards

Where's My Stuff?
o Track your recent orders.
o Use Your Account to view or change your orders.

Shipping & Returns
o See our Shipping Rates & Policies
o Read our Returns Policy

Need Help?
o Forgot your password? Click here.
o Redeem or buy a gift certificate.
o Visit the Help Desk.

Text Only                                                                 Top of Page Amazon.com | Home | Books | Music | DVD | Video | Toys & Games | Electronics | Camera & Photo | Software | Computer & Video Games | New Cars | Kitchen | Tools & Hardware | Lawn & Patio | Health & Beauty | Auctions | zShops | e-Cards | 1-Click Settings
Shopping Cart | Your Account | Help | Sell Items International | Top Sellers | Friends & Favorites | e-Cards | Play Station2

Our Internationa Sites: United Kingdom, Germany, France

*FIG. 11A* amazon.com

| AUCTIONS | ART & COLLECTIBLES | zSHOPS | KITCHEN | LAWN & PATIO | TOOLS & HARDWARE |

🛒 | HELP
YOUR ACCOUNT

| WELCOME | BOOKS | MUSIC | DVD & VIDEO | ELECTRONICS | SOFTWARE | TOYS & VIDEO GAMES | HEALTH & BEAUTY | HOME LIVING |

| HOW TO ORDER | GIFT IDEAS | TOP SELLERS | FRIENDS & FAVORITES | FREE E-CARDS |

Search People: [All ▽] [_____](GO)    Your Favorite People: [Select ▽](GO)

Your About You Area > Favorite People > Edit

Update your Favorite People List
The following are your Favorite People. You can change status of Favorite People or remove them from your list right here.

| Your Favorite People: | ⊙ Trusted Friends | Favorite People: | Delete |
|---|---|---|---|
| Doug Vaughn | ○ | ⊙ | ○ |

(Save Changes)

Trusted Friends in the making
You've previously invited the following people to become Trusted Friends, but they have not responded. If you want to send another note to any of these people, delete them from this list, and send them another e-mail.

People you've invited:                                                      Delete
JohnDoe@example                                                                ☐

(Save Changes)

Receiving e-mails from others
☐ I'd rather not receive e-mail each time I'm added to a person's group of Trusted Friends.

(Save Changes)

Find out more about managing your Favorite People in the Friends & Favorites FAQ.

Friends & Favorites | Top Reviewers | Purchase Circles | Discussion Boards | Refer-A-Friend | Free e-Cards Where's My Stuff?
- Track your recent orders.
- Use Your Account to view or change your orders.

Gift Certificates
- Get help redeeming a gift Certificate
- Order a gift certificate Need Help?
- Forgot your password? Click here.
- Visit the Help Desk.

Check out our new navigation and tell us what you think.

Text Only                                                                Top of Page Amazon.com | Home | Books | Music | DVD | Video | Toys & Games | Electronics | Camera & Photo | Software | Computer & Video Games | New Cars | Kitchen | Tools & Hardware | Lawn & Patio | Health & Beauty | Auctions | zShops | e-Cards | 1-Click Settings
Shopping Cart | Your Account | Help | Sell Items Amazon.co.uk | Amazon.de

FIG. 11B

| Reply | Reply All | Forward | as attachment ▽ |     Download Attachments
| Delete |                                        | -Choose Folder-▽ | Move |
         Next | Inbox                                Add Addresses
   Date: Thu, Dec 1, 2000 08:54:33 -0700 (PDT)
   From: jexample@example
     To: JohnDoe@example
Subject: Amazon.com Friends & Favorites: Trusted Friend Invitation Hi !

We're happy to tell you that you've been added to John Example's group
of Trusted Friends at Amazon.com. As a Trusted Friend, you now have
permission to see a private view of John Example's "About You" page. This
private view features personal information such as purchases, ratings,
and comments that John Example has chosen to share with Trusted Friends
like you.

Click on the link below to see John Example's About You area:

http://www.amazon.com/exec/obidos/ppl/i/123ABCDEFG/

With Friends & Favorites, you get useful product information from
friends
you trust and people you respect. To learn more about this service,
visit
http://www.amazon.com/friends

--------------------------------------------------------- jexample@example.com requested that we send this message. If you'd rather
not receive an e-mail each time someone adds you as a Trusted Friend,
please click the link below and update this preference.

http://www.amazon.com/exec/obidos/customer-lonk-management/

Amazon.com
Earth's Biggest Selection
Find, Discover, and Buy Virtually Anything
http://www.amazon.com If you have questions or feedback about this Amazon.com service, please
e-mail us at friends-only@amazon.com

| Delete |                                        | -Choose Folder-▽ | Move |
         Next | Inbox
| Reply | Reply All | Forward | as attachment ▽ |     Download Attachments

FIG. 12

METHODS AND SYSTEMS FOR DISTRIBUTING INFORMATION WITHIN A DYNAMICALLY DEFINED COMMUNITY

PRIORITY CLAIM

This application claims the benefit of U.S. Provisional Application No. 60/166,547, filed Nov. 19, 1999 and U.S. Provisional Application No. 60/166,664, filed Nov. 19, 1999 which are incorporated herein by reference in their entirety.

BACKGROUND OF THE INVENTION

1. Field of the Invention

The present invention is related to feedback processing, and in particular to methods and systems for processing feedback received over a network.

2. Description of the Related Art

Networked systems have become an increasingly prevalent and vital technology. Networks, such as the Internet, allow large numbers of computer systems and people to swiftly transfer data across the globe. Despite the tremendous benefits afforded by networking large numbers of systems and people together, significant challenges are posed as well. It has become increasingly difficult to evaluate the quality of data accessed over networks. The data often comes from sources unknown by the recipient. Thus each recipient often has to individually evaluate each incoming datum. Because it is impractical for individuals to evaluate large quantities of data, and because certain types of data cannot be adequately evaluated using automated systems, valuable data concealed in vast amounts of less valuable data is often ignored.

For example, online merchant Web sites commonly provide various types of informational services for assisting users in evaluating products and other offerings. Such services can greatly aid consumers in deciding which product or offering to purchase. These informational services are particularly valuable for online purchases, where customers do not have the opportunity to physically inspect or try out products.

One type of information service involves providing feedback from product users. The feedback may be in the form of reviews. These reviews may be from professional reviewers or from customers. However, in conventional systems customer reviews often lack credibility, as consumers do not know if the review is from a "crank," who disapproves of every product, or from a very easy to please customer, who likes every product. Thus, when reviews disagree, consumers do not know which review to rely upon, making the reviews less useful. Further, when there are large number of customer reviews, it may be a tedious and time-consuming process locating the more worthwhile reviews. Therefore valuable reviews are often ignored.

SUMMARY OF THE INVENTION

The present invention is related to feedback processing, and in particular to methods and systems for processing distributed feedback received over a network. Data is distributed over a network to large numbers of remotely located individuals, one or more of which may provide feedback on the value or usefulness of the data.

For example, product reviews received from large numbers of product users may be distributed to large numbers of people, one or more of whom may evaluate one or more of the reviews. These evaluations may be used to indicate to readers the helpfulness or value of the reviews. Thus, one embodiment of the present invention advantageously helps on-line customers discover and evaluate products or offerings by presenting useful data or information, such as customer reviews, organized and presented so that the more useful reviews can be quickly located. By providing a system that allows customers to express their opinions and provide their expertise on products, customers can help each other determine what to buy and what to avoid. Further, customers reading other customers' reviews can rate the reviews, thereby helping identify which reviews are more useful, and which reviewers are more dependable.

The usefulness determination may be based on one or more factors. For example, the usefulness determination may be based on how similar the reviewer is in his or her opinions, interests, and preferences to those of the viewing customer. Similarly, past purchases, education level, and demographic information may also be used in helping determine the likely usefulness of a given reviewer's reviews to a given customer. Further, the usefulness determination may be based on how valuable other customers have found the reviewer's reviews, as described in greater detail below.

Customers may provide their reviews using a variety of techniques. For example, customers may provide a review by filling out a review form or other user interface. The review form may request a rating on a rating scale, a one-line review summary, the review itself, the customer's name, the customer's e-mail address, nickname, and/or other personal or identifying information, such as their photograph, geographical location, educational achievements, and so on. Customers may also be identified during sign-in, via a user ID and password, by reading a cookie stored on the customer's computer, or using other techniques, in conjunction with submitting a review. Optionally, customers may be allowed to provide reviews anonymously, that is, without identification. In one embodiment, the customer can specify whether one or more of the customer's name, e-mail addresses, and/or other personal or identifying information are to be later displayed in conjunction with the review, or if the review should be displayed anonymously.

For example, the reviews submitted by customers are later displayed in conjunction with the offer of the product for sale. For non-anonymous reviews, the reviewer's name or nickname, as selected by the reviewing customer, will be displayed in conjunction with the review. Further, non-anonymous customer reviews are optionally linked to a reviewing customer's public profile, which provides additional public information about the review author.

Customers reading the reviews can rate individual reviews based on their perceived usefulness. The review rating may include a point score and/or a "useful" or "not useful" designation. The review ratings allow identification of the more useful reviews as well as the identification of customers who tend to provide more useful reviews. Reviews provided on product detail pages may include an indication noting which reviews have been considered useful or valuable by others. Thus, customers can help other customers by not only providing product reviews, but also by rating or reviewing those reviews. This allows customers trying to decide which product to purchase to quickly focus on reviews that others have already designated as being useful. Further, customers reviewing products benefit by knowing they are helping others.

Further, the reviews may automatically be ranked for display, and/or filtered out, based on the votes they receive. For example, assuming multiple reviews have been submitted for a particular product, those voted to be the most useful may be displayed first (e.g., closer to the top of a product detail page).

The reviews voted to be the least useful may be displayed in a less prominent location (e.g., near the bottom of a product detail page), or may be filtered out (not displayed).

Customers may be ranked based on the tally of useful and/or useless votes that they have received on their reviews. These customers may be identified with appropriate language, markers or other indicators in association with their reviews and on their profile page. For example, a reviewing customer may have a designation of "top 100" reviewer if the customer received enough "useful" votes to place the customer in the top 100 reviewers. This provides customers valuable feedback on how well they write reviews and provides a psychological incentive to improve their reviews so as to achieve a better designation.

Furthermore, customers looking for reviews by a highly rated reviewer can activate a link to view some or all of the reviews written by that reviewer. Thus, if a customer identifies a reviewer that the customer particularly likes, the customer can quickly access reviews by that reviewer. Further, when viewing reviews of a product, the customer can specify that a selected reviewer's review be presented first, at the beginning of a list of reviews. In one embodiment, the customer can specify that reviews written by a selected reviewer or reviewers by e-mailed to the customer.

In addition, another novel aspect of one embodiment of the present invention is that customers are given the ability to selectively share with other customers or people they know information about items they have purchased. A customer may be able to specify which specific individuals and/or groups the information is to be shared with. Further, the customer may specify that different types of information are to be shared with different specific individuals and/or groups.

By sharing their purchase information as well as other types of information, customers can help each other make better purchase decisions. Thus, the present invention provides an efficient and accurate method of gathering customer purchase information and opinions, and sharing that information with designated recipients. These recipients can then base at least some of their future purchase decisions on the recommendations, experiences and purchase histories of others, and in particular, people they know and/or trust.

A novel infrastructure is provided that captures and stores customer-to-customer relationships for future use. This infrastructure facilitates future sharing of other types of information such as wish list, reviews, auctions, favorite artists, instant recommendations, shipping address, and so on.

BRIEF DESCRIPTION OF THE DRAWINGS

Exemplary systems, processes, services and pages which implement the various features will now be described with reference to the following drawings, in which:

FIGS. 1A-B illustrate example profile pages for entering information related to a customer's profile;

FIG. 3A illustrates an example public profile page, including profile information entered into the profile page illustrated in FIG. 1A;

FIG. 3B illustrates an example customized review page;

FIG. 4 illustrates a product information page, including a review, a rating associated with the review author, and including a link to a review entry page;

FIGS. 9A-C illustrate an explanation page that explains what the different statuses that can be assigned by one customer to another customer;

FIGS. 10A-B illustrate an example customer purchase sharing page for specifying for which of a customer's purchases is information to be shared with designated others;

FIG. 11A illustrates an example page used by a customer to specify who may view the customer's purchase sharing page;

FIG. 11B illustrates an example page used by a customer to change the status of another user with respect the customer and to display who has been invited to view the customer's purchase sharing page but has not responded; and FIG. 12 illustrates an example e-mail notification informing an invitee to view a customer's purchases page.

DETAILED DESCRIPTION OF THE PREFERRED EMBODIMENT

Figure 1A:
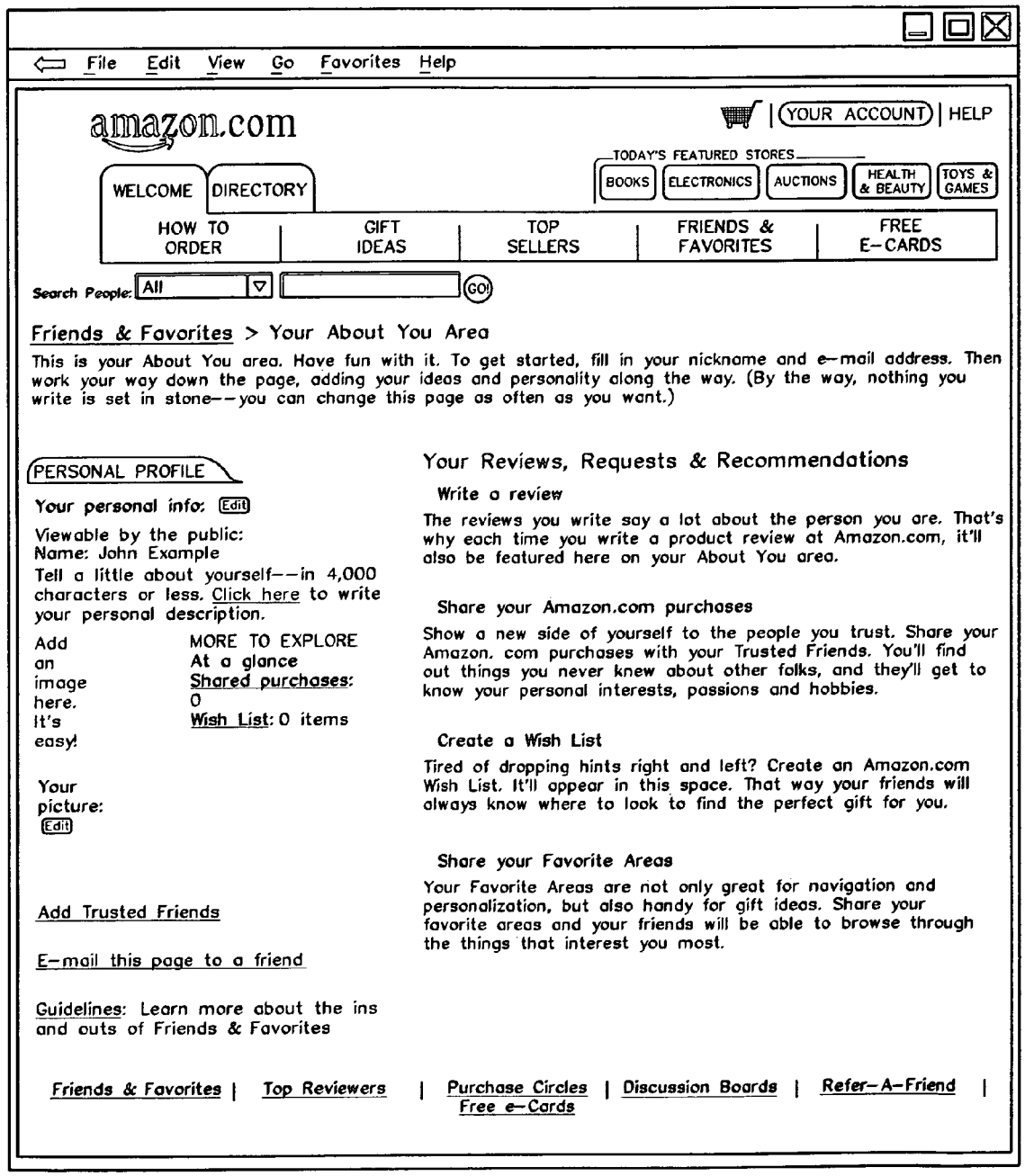

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In the figures, words and phrases are underlined to indicate a hyperlink to a document or Web page related to the underlined word or phrase. In addition, unless otherwise indicated, the functions described herein are preferably performed by executable code running on one or more general purpose or computers or on servers.

The present invention is related to feedback processing, and in particular to methods and systems for processing distributed feedback received over a network. Data is distributed over a network to large numbers of remotely located individuals, one or more of which may provide feedback on the value or usefulness of the data.

Advantageously, a review processing system helps customers select which items to purchase and helps customers learn about products or offerings by presenting useful information, such as customer-authored product reviews. Customers can thus help each other determine what to buy and what to avoid. Further, customers can rate product reviews, thereby identifying which reviews are the most useful and which reviewers tend to provide more useful reviews. For example, product reviews received from large numbers of product users by an online merchant may be distributed to large numbers of people, one or more of whom may evaluate one or more of the reviews. To help customers quickly locate the more helpful reviews, these evaluations may be aggregated and displayed in association with the reviews. Reviewer profiles are generated so that customers can better locate reviewers whose opinions they are more likely to find helpful. The review processing system may be associated with a particular merchant Web site, or may be used across multiple Web sites for several corresponding merchants.

As described in greater detail below, to further provide helpful customer generated shopping information, customers can selectively share information regarding purchases with friends, family, and others.

Because consumers or customers are very interested in product reviews by other customers, and in purchases made by those who opinions they value, a merchant which provides such customer reviews, helpful review ratings, and provides for the sharing of purchase information among customers, is more likely to be visited by additional consumers. These additional visiting consumers may make purchases at the merchant's site, thereby improving the merchants sales.

The following detailed description will first describe the process of generating customer profiles, then describe the actual review generation and display process, the process of reviewing reviews, and the process of ranking reviewers. In addition, a novel process whereby customers can automatically and selectively share their purchase information with each other will be described. Additional embodiments of the present invention will then be described with reference to the figures.

As discussed above, in addition to providing customer reviews, a profile is optionally generated for a given customer reviewer. As will be discussed in greater detail below, all or portions of the profile may be presented in conjunction with the reviewer's reviews as part of the reviewer's public profile. This provides a more tangible identity readers can better relate to, and further enhances the credibility of the reviews.

The generation of reviewer profiles will now be discussed in more detail. The customer profile is stored in a customer database located connected to the merchant's Web site. Initially, the profile may contain limited or no information. Information may be added to the profile using a variety of techniques. For example, when a customer goes through a setup process, discussed in greater detail below, a profile template or form is presented to the customer. The customer may enter profile additional information into the form and specify what additional information is to be displayed on the customer's public profile page, that is, the page or pages containing profile information viewable by the public.

In one embodiment, even if the customer has not gone through the profile setup process, when the customer writes a non-anonymous review, those non-anonymous reviews will appear either directly or as a link on a customer's public profile page, also termed a "user page" or an "about you area" page. However, in this instance, the profile page will not contain profile information received from the profile setup process.

In addition, where the reviewer has not gone through the profile generation process, in order to associate reviews with a particular reviewer, past non-anonymous reviews are analyzed, and based on the e-mail addresses associated with the past non-anonymous reviews, the review processing system deduces which customer account or accounts are likely to be associated with the review author. Corresponding account identifiers are then included in the customer's public profile for later confirmation by the customer. An e-mail or Web site notification is optionally provided to the customer, informing the customer of the added public profile information and, where appropriate, requesting confirmation of the added information. Further, in one embodiment, the profile page will not show any customer information until the customer explicitly sets up his or her page.

The customer/author profile may include one or more of the following:
1. Author's picture
2. Author's self description
3. Author's nickname
4. Author's name
5. Author's e-mail address
6. The non-anonymous reviews that the author has written
7. The number of non-anonymous reviews that the author has written
8. The number of useful or helpful votes that each review has received
9. The number of useful or helpful votes that the author has received through his or her reviews
10. The date the customer first became a customer, registered, created the profile, and/or last edited the profile
11. Hobbies
12. Favorite sports teams
13. Previously purchased products
14. Customer demographic information, optional including one or more of the following: geographical location, age, gender, profession, education, income, marital status, number of children, political affiliations, religious affiliations, ethnicity
15. The author's preferred or favorite reviewer or reviewers The above profile items are discussed in greater detail below.

For one or more of the above items, the customer is optionally allowed to designate which items are to be public, that is, available for viewing by anyone visiting the merchant Web site, and which items are to be private, that is, not available to the general public. For example, in one embodiment, viewing of private items is restricted to the customer. In another embodiment, viewing of private items is restricted to the customer and to those specifically designated by the customer. Optionally, the review processing system can designate certain information to be public and certain information to be private.

A preview of the public profile is presented to the customer for approval or for editing before the profile is published. Customers can then later edit their profile information, as well as the private/public designations. The edited information may be updated upon submission of the changes, or it may take a period of time until the changes are made available to others.

A viewer can access a public profile page by activating a link within or adjacent to a review provided by the customer, by typing in the customer's name, and/or by searching on the customer's name or nickname. The public profile may include or link to the customer's public profile information, non-anonymous reviews written by the customer, and other information. Furthermore, as discussed below, the reviews may optionally be displayed in conjunction or linked to customer feedback with respect to the reviews. The customer feedback may be in the form of ratings of the customer's reviews and/or the number of "useful" and "non-useful" votes received for the reviews. In addition, the customer's overall review rating or ranking based on ratings provided by others can be displayed. The count of all the reviews a customer has written may also be displayed. The customer may optionally be allowed to designate some or all of this information as private or public.

The profile items listed above will now be discussed in greater detail. With respect to the review author's picture, by including a customer's picture on the customer's public profile page, the reviewer will have more creditability with readers of his or her review, and reader can better identify or relate to the reviewer. In one embodiment, customers can optionally supply a URL to an image, such as picture or photograph, located at another Web site. The photograph may be shown immediately with the profile once the profile is published. In one embodiment, the customer can supply any size picture, however the width and height may be restricted through the use of an appropriate image tag.

Customers may be allowed to later change the URL to their picture. Once a new URL is provided, the changed URL may be available immediately. In another embodiment, rather than provide a URL to a photograph, customers may upload a photograph to the merchant Web site, which then hosts the photograph so that it can be served to remote terminals used by viewers.

With respect to the self-description information, customers can describe themselves in a free-form manner, allowing customers to build any identity, real or imagined, for viewing by others. The self-description may be limited to a certain number of characters, such as 4,000 characters. After the self-description is submitted, any HTML tags may optionally be deleted before storing the description in the database. Customers may be allowed to designate their self-description as public or private. The self-description field may optionally pre-populate if the customer has already provided the self-description, such as during the registration process when entering a wish list.

With respect to a review author's nickname, inclusion of a nickname as part of the customer's profile advantageously allows customers to maintain a significant level of anonymity and to create an alter ego by posting reviews under their nickname rather than their actual name. At the same time, by including nicknames, reviews will still be attached to a tangible identity, adding credibility to the reviews and allowing readers of the review to "get to know" the reviewer.

While in one embodiment the same nickname may be used by more than one customer, in another embodiment, nicknames are unique, so that two people cannot have the same public identity. However, to allow greater freedom in choosing nickname, optionally, only active nicknames have to be unique. Thus, when a customer creating his or her profile enters a nickname, that nickname is compared to already existing customer nicknames. If someone else is using the entered nickname, then the customer may be requested to select a different nickname. The process repeats until the customer either enters or selects a unique nickname or exits the nickname selection process. In order to speed-up the selection of a nickname, the customer is optionally presented with a selection of unique nicknames from which to choose or may be assigned a nickname.

Nicknames may be used by customers to quickly locate reviewer-related information. For example, when someone wants to locate information on a particular customer, or locate other reviews by a particular customer, they may enter the customer nickname into a search field and activate a search function. The requester is then presented with the customer's public profile page, including the customer's reviews or links to the customer's reviews. This search feature allows users to quickly and easily find pages and reviews associated with a given reviewer and nickname. In one embodiment, if a searcher enters a previous customer nickname that is no longer in active use, the entered nickname will be compared against inactive or historical nicknames. If a match is found, the searcher is be presented with the reviewer's profile page and reviews, as well as a notification of the reviewer's new nickname.

The customer's nicknames as well as some or all of the other customer profile information may be used across multiple sites and electronic commerce stores associated with a merchant and/or a merchant site. For purposes of illustration, the merchant Web site in the disclosed implementation is the Web site of Amazon.com. As is well known in the field of Internet commerce, the Amazon.com site includes functionality for allowing users to browse and make online purchases from a catalog of millions of book titles, as well as to purchase toys, games, electronics, music, videos, home improvement items, cars, and the like. Amazon has an associated auction site, as well as "zShops," and other retail stores. A selected customer nickname may be used across several or all of the sites associated with Amazon, which is a significant convenience for the customer. In another embodiment, different nicknames may be used for different related sites, as well as for unrelated sites.

To enhance user customization, customers may optionally be allowed to change their nicknames. The new nickname may be immediately available or may be available after a time lag. Optionally, a customer may be required to select a nickname and have the nickname displayed on their public profile page and/or their reviews. In another embodiment, the selection of a nickname is optional, and the user may elect to keep the nickname private. In one embodiment, in response to a search request or the activation of a nickname history link, or other user actions, a customer and/or other viewers may be presented with nickname history, that is, a list of previous nicknames associated with the customer.

To further personalize communications with customers, the customer's nickname or actual name, as included in the customer's profile information, may be used as part of a salutation or greeting to the customer when communicating to the customer. For example, if the customer's name is "John Doe," e-mails or customer-specific Web pages may include the greeting "Hi John!" or "Hello Mr. Doe" The customer name will optionally pre-populate a profile template name field if the customer has already provided the name, such as during a customer registration process, while creating a wish list, while ordering a product, or while otherwise accessing the merchant Web site.

With respect to the author's e-mail address, customers can choose to communicate with visitors to their public page by having their e-mail address displayed to viewers. Optionally, to better ensure the integrity of the review process, customers may be required to supply an e-mail address. The e-mail address may be displayed as soon as the profile page is published. In one embodiment, e-mail addresses do not have to be unique. If there are multiple identical e-mail address, an e-mail address selection process will uses selection and validation rules. Optionally, as a default, the e-mail address is designated as "private," that is, not displayed to the public. However, the customer can change the designation to "public," in which case the customer's e-mail address will be displayed on the customer's public profile page The e-mail address field may optionally pre-populate if the customer has already provided the e-mail address, such as during the registration process.

In order to prevent unauthorized access, authentication of the customer is performed before permitting the customer to setup or edit a profile. For example, before accessing a profile page, customers may be required to register and/or to have already purchased items from an associated merchant site. The registration process may request that the customer provide information such as name, shipping address, billing address, and/or e-mail address. Customers may also be identified or otherwise authenticated during sign-in, via a user ID and password or otherwise recognized, in conjunction with submitting a review. In one embodiment, the customer can specify whether one or more of the customer's name, e-mail addresses, and/or other personal or identifying information are to be later displayed in conjunction with the review. Optionally, reviewers may be allowed to provide reviews anonymously, that is, without identification.

One embodiment of the review entry process will now be described. In one embodiment, a "review entry" link may be provided in association with a product. By activating the link, a user is presented with a review entry form. The review form accessed by the customer may request a rating on a rating scale, a grade, a one-line review summary, and/or a full textual review.

Optionally, to insure the integrity of the reviews, a potential reviewer is authenticated before being allowed to submit a review. If the potential reviewer has not yet established an account, the potential reviewer is asked to establish a customer account. Alternatively, anyone may be allowed to submit a review.

To further increase the integrity of the review process, customers may be restricted to submitting or having displayed only one review for each product. This avoids having one customer who loves or hates a product from skewing the impression upon readers by submitting multiple reviews stating one point of view. Thus, in one embodiment, a review database is analyzed to determine if the customer has previously submitted a review of a given product. If not, then the review is accepted and stored in the review database for later display.

If the customer has previously submitted a review for the product, the reviewer is so notified and prevented from submitting additional reviews for that product. In another embodiment, the new review may be accepted, but not displayed. In still another embodiment, the customer may be offered a choice of which review is to be displayed. In yet another embodiment, the new review is accepted, stored, and later displayed in associated with the product, but the older review is automatically removed from display on the merchant Web site, and optionally deleted from the review database.

If the customer has not yet filled out a profile form, such a form may now be presented to the customer before the review form is provided. As previously described, personal information, such as the customer's name, the customer's e-mail address, nickname, and/or other personal or identifying information, such as photograph, geographical location, education, and so on, may be requested or some or all of the information may have already been gathered during the registration process.

The reviews submitted by customers are later displayed in conjunction with the offer of the product for sale. For non-anonymous reviews, the reviewer's name or nickname as selected by the reviewing customer, will be displayed in conjunction with the review. Further, as discussed below, non-anonymous customer reviews optionally link to the reviewing customer's public profile provides additional information about the author of the review.

The customer may elect to have the review displayed with all or a portion of the customer's name as provided during the registration process, or may elect to have the customer's nickname displayed instead. As a default, all or a portion of the customer's nickname as entered in the customer's profile page will be displayed in association with the customer's review, unless the customer instructs otherwise. If the customer has not created a public profile, then as default, all or a portion of the customer's actual name will be displayed, subject to change by the customer. Alternatively, the consumer may elect to have the review presented anonymously, that is, without a customer identifier, such as a name or nickname.

In one embodiment, the customer's name or nickname presented in association with non-anonymous reviews is linked to the customer's profile page. Thus, when a viewer activates the link, the viewer will be presented with the customer's profile page, including the information that the customer has designated as "public," but excluding the information that the customer has designated as "private." If the review is anonymous, then the review is not linked to the customer's profile page.

The evaluation and rating of reviews will now be described in detail. To further enhance the usefulness of customer reviews, and to enable other customers to more quickly and accurately locate useful customer reviews, individual customer reviews may be rated or reviewed by others. For example, the customer reviews may be rated or voted on as "very useful," "very helpful," "useful," "helpful," "not helpful," or "not useful" by others, or the customer reviews may be rated on a point or star system, where the higher the number of points or stars, the more useful or the better the review. In one embodiment, rating of customer reviews may be restricted to other customers, as opposed to the general public reading the reviews. This enhances the reliability of the ratings, as it is less likely that the other customers will be pranksters giving random ratings than is the case with non-customers. However, in another embodiment, the rating of customer reviews may be performed by the general public, to thereby obtain a larger voting base.

To ensure the integrity of the rating process, if a customer has previously rated or reviewed a review, the customer is so notified and prevented from submitting additional ratings for that review. In another embodiment, the new rating may be accepted, but not displayed. In still another embodiment, the customer may be offered a choice of which of the customer's ratings is to be used. In yet another embodiment, the new rating is accepted, stored, and later used in rating the reviewer, but the older rating is automatically no longer user in rating and/or rating the reviewer. To further ensure the integrity of the rating process, customers are optionally prevented from rating their own reviews. Once a customer has submitted their rating of the review, the customer may be redirected back to the product item page from which the customer had previously linked to provide the rating.

The number of "useful" and/or "not useful" votes or the like that a review has received may affect how the review is displayed on the merchant Web site. In addition, the number of "useful" and/or "not useful" votes that a customer's reviews receives may affect how information about the reviewer is displayed on the Web site.

Customers may be ranked based on the tally of useful and/or useless votes, or the like, that their reviews have received. In tallying votes, a "useful" vote may have a value of "1," and a "not useful" vote may have a value of "−1." For example, a reviewer with 100 "useful" votes and 20 "not useful" votes may have a tally or score of 80. In another embodiment, the tally may be based on only "useful" or on only "not useful" votes, or equivalents thereof. The "useful" and "not useful" votes may optionally be assigned different values. For example, a "useful" vote may be assigned a value of "2" and a "not useful" vote may be assigned a value of "−0.5," so that "useful" votes are weighted more heavily than "not useful" votes.

Optionally, the tally of ratings given to anonymous reviews is tracked separately from those given to non-anonymous reviews. In addition, the total tally of all ratings may also be tracked. In one embodiment, a rating of a reviewer's anonymous review is given less weight then that of a rating of a non-anonymous review by the reviewer. For example, a "useful" vote for a non-anonymous review by a given reviewer may be assigned a value of "2," while a "useful" vote for an anonymous review by the given reviewer may be assigned a value of "1." Generally, this allows non-anonymous reviews and their authors to more easily attain higher scores or ratings than anonymous reviews, thereby encouraging reviewers to provide non-anonymous reviews, which generally appear more credible to readers.

The tally or tallies discussed above may be continuously calculated in substantially real-time as new ratings are received, or periodically, such as once every day.

All or some of the ranked customer reviewers may be identified with appropriate language, markers or other indicators in association with their reviews and/or on their profile page. For example, each customer review may have the tally, score, rating and/or ranking displayed with or linked to the review. In another example, only selected reviewers are identified by their rating or score. For example, only reviewers having a tally or score above a certain amount or having a certain rating or better may be identified. Thus, in one embodiment, a reviewing customer may have a designation of "top 100" reviewer if the customer received enough "useful" votes and/or few enough "not useful" votes to place the customer in the top 100 reviewers. This provides customers valuable feedback of how well they write reviews and provides a psychological incentive to improve their reviews so as to achieve a better designation.

In one embodiment, where a "useful" or helpful vote is worth 1 point, and a "not useful" or "not helpful" vote is worth 1 point, and the customer/reviewer score is equal to the useful votes minus the not useful votes, the following or similar designations are displayed to viewers next to the reviewer's reviews, review summaries, and/or public profile page:

| Score | Designation |
|---|---|
| <250 | No designation |
| 250-999 | "Trusted Reviewer" |
| 999-4999 | "Very Trusted Reviewer" |
| >4999 | "Most Trusted Reviewer" |

The reviewer may be given a reward in recognition of achieving or bettering a predetermined score, rating or ranking. For example, if the reviewer has achieved a score of better than 999, the reviewer may receive a discount, gift certificate, or free product. Other types of rewards may include having items that the reviewer is auctioning be given highlighted or given special emphasis. In addition, information, or a link to information, on the auction item or other item for sale by the reviewer may be included on the review's profile page.

In addition, a reviewer's rating may affect the positioning of the reviewer's review in a group of reviews. For example, the better the rating of the reviewer, the better or higher positioning of the reviewer's review. The review placement may be based on other factors in addition to or instead of the reviewer rating, such as on the recentness of the review, the number of similar products purchased by the reviewer from the merchant site, or other factors. Further, the placement of a given review within a group of reviews may be different from viewer to viewer.

For example, the placement of a given review may be based at least partly on the viewer's profile and/or purchase history, and not just on the reviewer's rating or rating. Similarly, if a reviewer has been designated as a favorite or preferred reviewer by the viewer, then a review by that reviewer may be given higher or more prominent placement. In one embodiment, the placement of a given reviewer's review in a group of reviews may be partly based on how similar the reviewer is in his or her opinions and preferences to those of the viewing customer.

Thus, for example, if the product being reviewed is a book, the review of a first reviewer with a relatively lower rating or ranking than a second reviewer, but who has purchased several of the same or similar books as the viewer, may have a higher placement than a review from the second, higher ranked reviewer, who has purchased relatively fewer or none of the same or similar books as the viewer. However, for another viewer with different characteristics or having a different purchase history, the second reviewer's review may have a higher placement than the first viewer.

The reviewer's geographical location, education, expressed interest in various areas, such as history, science, and so on, as compared to that of the viewer, may affect the review placement as well. Information about the viewer's characteristics, including the viewer's purchase history, may be retrieved from a cookie stored on the viewer's computer and/or retrieved from the viewer's account information stored in a merchant database.

The placement of the customer's own review may be given a prominent placement when the customer activates a link or otherwise accesses reviews for a particular item or product that the customer has reviewed. For example, the customer's own review may be provided as the first review and/or may be bolded, specially colored, or otherwise emphasized.

In order to appropriately place reviews, in one embodiment the viewer's identity is ascertained so that the viewer's characteristics may be stored in the viewer's customer profile, and can be located in the appropriate customer database. The viewer's identity may be determined by reading the viewer's cookie, by the viewer logging in to the Web site, or using other known techniques. The term "identity" is used to refer to one or more of the viewer's actual name, the viewer's account, the viewer's computer, or other types of identity.

To further facilitate customers' ability to locate useful reviews, customers looking for reviews by a highly rated reviewer can activate a link to view several or all of the reviews written by that reviewer. Thus, if a customer identifies a reviewer that the customer particularly likes, the customer can quickly access reviews for different products or items by that reviewer. Further, when viewing reviews of a product, the customer can specify that a selected reviewer's review be presented first, at the beginning of a list of reviews. In one embodiment, the customer can specify that reviews written by a selected reviewer or reviewers by e-mailed to the customer.

In addition, a customer can request that only the reviews of reviewers having achieved a high rating should be displayed. For example, the customer can select the rating level that a reviewer or review needs to achieve before the review is displayed to the customer. The customer can also request that the customer be notified when a particular reviewer submits a new review. The customer may request that the notifications be filtered based on the item being reviewed, the category of item being reviewed, when the particular reviewer provides a favorable review, such as a 3 star or better review. Thus, customer can quickly find out when a new, well received product is available. In addition, the customer may be request that the customer be notified whenever a new review is submitted for a selected item. The notifications are then provided in accordance with the customer's requests.

Thus, the review evaluations allow customers deciding which product to purchase to quickly focus on helpful reviews that others have are ready designated as being useful. In addition, a customer can quickly access reviews by reviewers whose opinion the customer values. Further, customers rating products benefit by knowing they are helping others.

In addition, another novel aspect of one embodiment of the present invention provides customers the ability to selectively and automatically share with others information about items they have purchased. The customer can specify which specific individuals and/or groups the information is to be shared with. Further, the customer may specify that different types of information are to be shared with different specific individuals and/or groups. Customers are thereby provided the ability to dynamically specify which information should be kept private and how private to keep certain information.

By selectively sharing purchase information, reviews, as well as other types of information online, customers can help each other make better purchase decisions while maintaining a desired level of privacy, thereby increasing customer satisfaction and decreasing returns. Thus, the present invention provides an efficient and accurate method of gathering and customer purchase information and opinions, and sharing that information with designated recipients. These recipients can then use the recommendations, experiences and purchase histories of others, particularly those of people they know and trust, in making their own purchase decisions.

In addition, one embodiment of the present invention provides a novel infrastructure that captures and stores customer-to-customer relationships for future use. In addition to the sharing of purchase information, the novel infrastructure facilitates the sharing of other types of customer information, such as wish lists, reviews, auctions, favorite artists, instant recommendations, shipping address, and so on.

The selective sharing of customer information will now be described. As is discussed in greater detail below, customers can define a "Personal Purchase Circle" set that includes a list or designation of people and/or groups that a customer has given permission to see his or her purchases, opinions, and/or ratings. The Personal Purchase Circle operates generally by tracking purchases of items, such as books, movies, or other items, made by the customer as well as corresponding "private" rating or reviews, and sharing the purchase and private review information with a one or more people or groups as specified by or defined by the customer. In addition, if the customer has been provided permission to see the purchases of others, that list may be provided to those who the customer has given viewing permission to. Thus, a dynamic customer-defined community for exchanging information is created. By way of example: If Ken has given Brian and Warren permission to see his purchases, and Maryam has given Ken permission to see her purchases, then Brian, Warren, and Maryam make up Ken's Personal Purchase Circle.

Once a person has been added to a customer's Personal Purchase Circle, a notification or invitation may be provided to the added person, also termed an invitee. For example, the added person may be notified via e-mail or a message on the merchant's Web site that she or he has been added to the customer's Personal Purchase Circle. The notification may contain a link to the customer's profile page, described below, to provide easy access. If the invitee activates the link, the invitation is considered accepted. The customer may be provided with a notification that the invitee has accepted the invitation and/or view the customer's profile page.

In addition, an e-mail and/or Web notification may be provided to a customer when a member of the customer's Personal Purchase Circle bought purchased a new item or when other changes occurred to the member's profile page. Optionally, customers may request not to be sent any type of notification, or request not to be notified by e-mail but have notification provided on the merchant Web site, or request not to be notified via a Web page display, but have notification provided by e-mail.

To reduce or prevent spam or unwanted e-mail, in one embodiment and an invitee will not get more than a specified number invitations from the same customer. The specified number may optionally be set by the customer and/or the Web site manager. The e-mail addresses and customer IDs that a customer has already sent an invitation to are tracked. The customer is prevented from sending more invitations to the invitee than the specified number limit.

Each address entered into the invite box may be evaluated against one or more of the following set of rules. If the invitee e-mail address provided by customer fails to match those in a customer database associated with the Web site, a one-use token is sent to that e-mail address. The one-use token includes a link to a Web page that asks the invitee to sign-in as a customer if the invitee has already established an customer account. If the invitee does successfully sign-in as a customer, then the e-mail address is stored in association with the invite's customer account.

The invitee may also be asked to establish a customer account if the invitee is not yet a customer. If the e-mail address provided by the customer does match the e-mail address of an existing customer, an e-mail is sent to the invitee, including a link to a registration page, where the invitee can apply to be a registered customer with his or her own profile page. Generally, an e-mail is sent to the specified e-mail address, where the e-mail includes links to two URLs. The first link's to the inviting customer's profile page. The second link is in the form of a one-use token in case the e-mail address of the invitee is not their primary Amazon.com account.

If the e-mail address provided by the inviting customer matches two or more customer accounts in the customer database, in one embodiment the customer account with the most recent order date will be considered the invitee. In another embodiment, the account with the most orders will be considered the invitee. The validity of e-mail addresses may be verified to prevent invitations to likely distribution lists or other suspect addresses, such as those beginning with postmaster@, root@, or administrator@. The customer may view a list of the customer's invitees as well as a list of invitees who have accepted the customer's invitation to view the customer's profile page.

A customer may selectively designate via the "profile page" which purchases, opinions and ratings are to be visible to customers within the customer's personal purchase circle. In addition, the profile page can list the other people in the customer's Personal Purchase Circle. By way of example: Brian and Warren can to go to Ken's profile page to see his purchases and what Ken thought about each purchase in the form of a rating or other review-type. In one embodiment, the customer, Ken in this example, can edit his profile page and selectively remove and/or add information about individual item purchases to his profile page. In addition, the profile page may display other customer-related information, such as the customer's wish list, reviews, auctions, favorite artists, instant recommendations, shipping address, demographic information, other profile information, and so on.

A customer can selectively allow those in the customer's Personal Purchase Circle to view who else is in the customer's Personal Purchase Circle. Those in the customer's Personal Purchase Circle who are permitted view who else is in the customer's Personal Purchase Circle are termed "Friend's of Friends." If, for example, Brian, Warren, and Maryam make up Ken's Personal Purchase Circle, then if so allowed, Maryam may be informed that Brian and Warren are also part of Ken's Personal Purchase Circle. Optionally, Maryam can also invite Brian and Warren to her Personal Purchase Circle. In one embodiment, Maryam cannot view Brian's and Warren's purchases unless they give her their corresponding permission.

When a customer adds a "friend of a friend" to her or his own Personal Purchase Circle, the notification to the invitee will state the name or nickname of the mutual friend. For example, Warren may go to Ken's profile page and see that Brian is also in Ken's Personal Purchase Circle. Warren then invites Brian to his own Personal Purchase Circle. The notification to Brian may state that "Warren (through Ken's profile page) has invited you to his Personal Purchase Circle." Thus, the invitee knows from whose profile page the invitor learned of the invitee.

To prevent unauthorized access to setup or edit a Personal Purchase Circle, authentication of the customer is requested. In setting up a Personal Purchase Circle, the customer may be presented with a form that includes one or fields or links allowing the customer to designate who is allowed to view the customer's purchases. The designation may be in the form of a person's e-mail address, name, nickname, or other identifying information.

The selective designation of purchases for viewing by other customers will now be discussed. All or a portion of the customer's purchase history is displayed for the customer, who may then decide or designate which purchases may be viewed by those in the customer's Personal Purchase Circle and which may not be viewed. In addition, the customer can review each listed purchase. The review may be include or be in the form of a grade, a point rating, or a star rating, where for example, 1 star is the worst rating and 5 stars is the best rating, and/or provide textual comments, if so desired. Customer's may then edit all or a portion of a notification or invitation to members of the customer's Personal Purchase Circle, informing them that they are invited to view the customer's profile page. The customer may be provided with a preview of what members of the customer's Personal Purchase Circle will see when they visit the customer's profile page.

The profile page may include one or more of the following:

1. A customer's purchases and a respective rating and/or review for each purchase.
2. A customer's favorite Community Purchase Circles (i.e. MIT, NY, etc). Community Purchase Circles, also termed as Community Interests, operates generally by tracking purchases of books, movies, or other items within particular user communities, such as particular cities, companies, universities, and the like. Additional details on a networked system for collecting and distributing Community Interest related information are described in U.S. application Ser. No. 09/377,447, titled USE OF CONTACT INFORMATION TO ASSIST USERS IN EVALUATING ITEMS, filed Aug. 19, 1999, which is hereby incorporated by reference in its entirety.
3. The other members of the customer's Personal Purchase Circle (Friends of Friends)
4. The ability to reciprocate the sharing with the customer and the other members of the customer's Personal Purchase Circle.
5. A counter to count the number of page views.

With each new purchase, the customer is asked whether the customer wants to designate the purchase as private or hidden, or if the purchase information may be shared with members of his or her Personal Purchase Circle. If the customer designates the purchase as public, then the purchase and related information will be automatically shared with a customer's Personal Purchase Circle by e-mail, Web page notification, and/or the customer's profile page. In one embodiment, unless the customer explicitly states that the purchase is to be hidden or private, the purchase is shared with the Personal Purchase Circle.

One embodiment of the present invention which may be used with Amazon's one-click feature will now be described. Amazon's one-click feature is well known to those of ordinary skill in the field of Internet commerce and is the subject of U.S. Pat. No. 5,960,411, assigned to Amazon.com, which is incorporated herein by reference in its entirety. If a customer has previously set up a Personal Purchase Circle and has the one-click featured enabled, then a check box or an equivalent field will appear in the "buy" check box, indicating the customer's willingness to display the one-clicked purchased item to those in their Personal Purchase Circle.

For customers that have not yet set up a Personal Purchase Circle, a prompt to set up a Personal Purchase Circle may be displayed on a one-click "thank-you page" and/or an order or thank-you page.

A set of online services will now be described in detail. The services will initially be described with reference to example screen displays which illustrate the services from the perspective of end users. A set of example processes and executable components that may be used to implement the services with be described with reference to architectural and flow diagrams.

FIGS. 1A-B illustrate example profile pages or forms for entering information related to a customer's profile. The forms may be displayed on a Web site, such as one associated with an on-line merchant. The forms allow users to enter information about the user. Some, of the information is viewable to the public and some may be selectively shared.

As illustrated in FIG. 1A, the user can enter a nickname and the user's e-mail address. In addition, the text or a link to the text of one or more reviews written by the user will appear on the user's profile page. The user may also add a picture or graphic to the profile by activating a "Your Picture" edit button. In addition, by activating the "click here" text, the user is presented with a form wherein the user can enter a free-form textual description of his or herself. The profile page further presents in an "at a glance" section a summary of the number of purchases the user has agreed to share and the number of items on the user's wish list. By activating the "Shared Purchases" link, the user is presented with a list of the purchases the user has agreed to share with designated others, termed "trusted friends." The list of purchases may also include associated private reviews.

FIG. 1B illustrates a form used to enter the user's personal, free-form textual description. In this example, the user is limited to 4,000 characters. In addition, the personal descriptions are automatically designated as public, that is, available for viewing by all customers. In another embodiment, the user can selectively make the personal description public or private. Once the user has entered the personal description, the user can activate the Submit button and the review will be stored in the client account database and displayed on the user's profile page.

Figure 2:
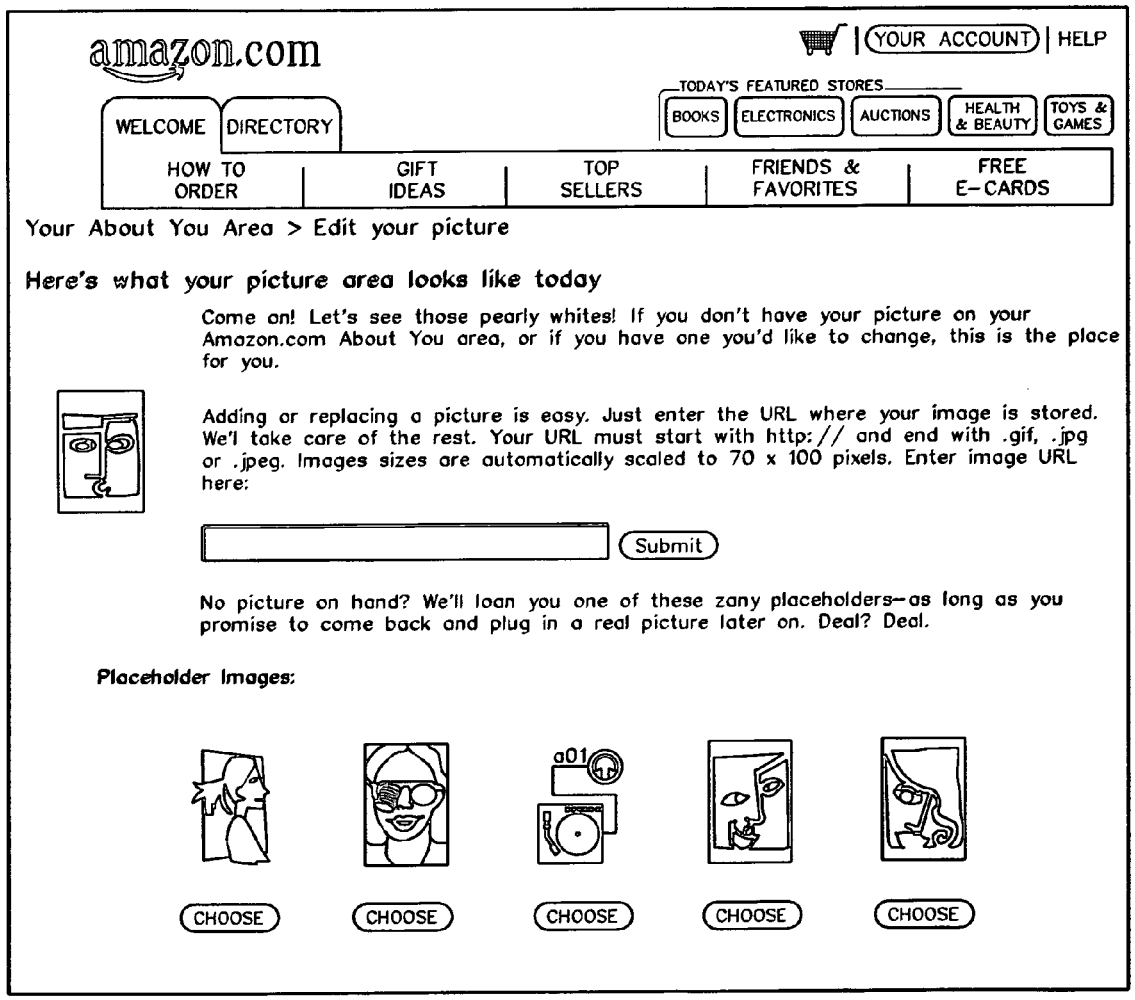
FIG. 2 illustrates an example page used to add a picture to the profile page illustrated in FIG. 1A.

FIG. 2 illustrates an example page used to add a picture to the profile page illustrated in FIG. 1A. In this example, the user can enter a URL into a URL field for a location where the user has stored an image. Once the user activates the Submit button, the Web site then retrieves the image for display on the user's profile page. In addition, the image may be scaled to save on storage space and to fit in the area designated to receive the image on the profile page. The user may also select from one or more graphics or images provided on the Web site page. Once the user selects the desired graphic or image by activating a Choose button, the graphic or image will appear on the user's profile page when viewed.

Figure 3A:
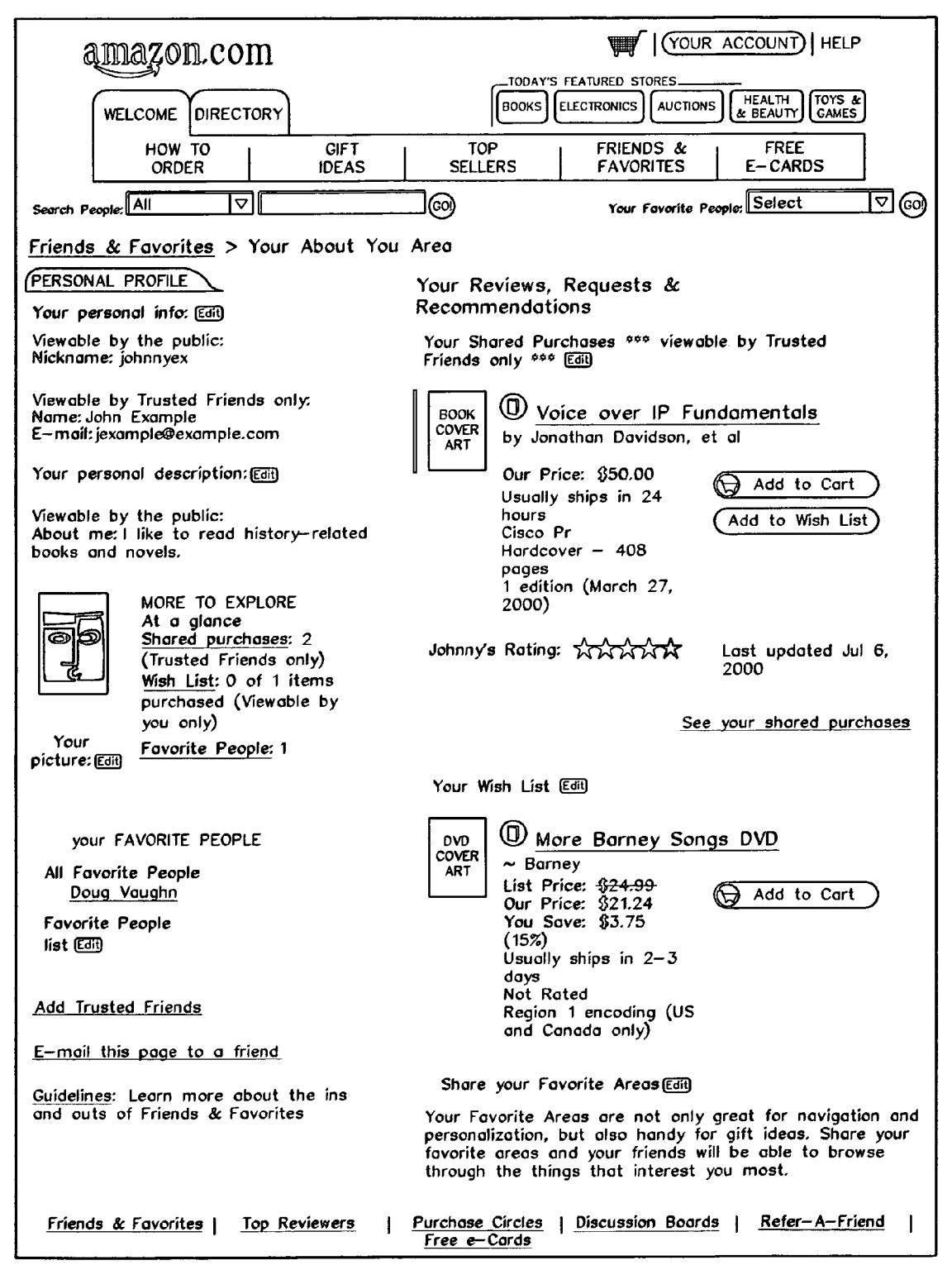

FIG. 3A illustrates an example public profile page, termed an "about you area," including profile information entered into the profile page illustrated in FIG. 1. The user nickname Johnny Ex, is designated as viewable by the public so that anyone can view it. The user name, John Example, and user e-mail address JohnExample@Example, are designated as viewable only to those viewers specified by the user, who are termed "trusted friends." The personal description section displays a personal description using the form illustrated in FIG. 1B.

An "at a glance" section on the page illustrated in FIG. 3A notifies the user that the user has specified that information for 2 of the user's purchases can be shared with the trusted friends. The "at a glance" section further notifies how many other customers the user as designated as "favorite people," that is other shoppers, friends, and favorite reviewers that the user likes, trusts or whose opinions the user is interested in. The user can add a customer to the user's favorite people list, via their profile page, or via their e-mail address. Then, when one of the designated "favorite people" writes a review, or comes up with an interesting recommendation, it will be displayed on a page designated for such purposes. Thus, the user has a customized review page displaying reviews more likely to be of interest to the user. The page illustrated in FIG. 3A displays the names of the designated favorite people, wherein the names are linked to the designated persons profile page. Activating the link causes the user's browser to display the corresponding profile page.

The example profile page illustrated in FIG. 3A also displays in a "your reviews, requests, & recommendations" area the user's designated shared purchases and private ratings generated by the user. Viewing by customers of the shared purchases is restricted to customers specified by the user.

In addition, a wish list area displays items that the user has placed on their wish list. In this example, the item is designated at private, that is, not viewable by other customers.

FIG. 3B illustrates an example customized review page including reviews by the user's designated "favorite people." In addition, the page illustrated in FIG. 3 displays, in a "your participation" area, the number of favorite people designated by the user, the number of designated shared purchases, and the number of items on the user's wish list. In addition, other top reviewers images and names are displayed, along with a tally of the number of helpful votes the reviewer has received and the number of reviews written by the reviewer on the Web site. The reviewers' names are linked to their profile pages. In addition, a link is provided to a page displaying the top rated reviewers.

The example page illustrated in FIG. 3A also displays the most popular book in the user's designated purchase circle. A purchase circle is a specialized bestseller lists, reporting best sellers, such as the top 10 or 20 best selling books, for a selected purchase group, such as for a given zip code, domain name, company, school or city.

Figure 3C:
FIG. 3C illustrates and example page including reviews written by the user associated with the profile page illustrated in FIG. 3A.

FIG. 3C illustrates and example page including reviews written by the user associated with the profile page illustrated in FIG. 3A.

FIG. 4 illustrates a product information page for a DVD of Mary Poppins, including an editorial review and two customer reviews, a rating associated with each customer review, a ranking of the customer who authored the second customer review, and a link to a review entry page, entitled "write and online review." As illustrated in FIG. 4, associated with each customer review is a survey question asking "was this review helpful to you?". A reader can vote yes or no by activating the appropriate soft button. In addition, associated with each customer review is a tally of how many "yes" votes the review received and how many total votes were received. For example, the first review, titled "is it impossible to make films like this anymore," includes a tally indicating that 5 out of 5 people found the review helpful. The second review, titled "fantastic fantasy," includes a tally stating that 11 out of 12 people found the review helpful, indicating that the review received 11 "yes" votes and 1 "no" vote. The second review, also includes a ranking indicating that the reviewer is a "top 50 reviewer," that is, has received enough "helpful" votes to place the reviewer among those 50 reviewers having the most "helpful" votes.

As illustrated in FIG. 4, the first review is by an anonymous author, called "viewer." Therefore, no links are provided is association with the review to the reviewer's profile page. The second review was authored by "Bob." The text "Bob" is linked to Bob's profile page. Thus, by activating the link the user is presented with Bob's profile page and can learn more about Bob and read other public reviews authored by Bob. In addition, the text "top 50 reviewer," indicating the reviewer's ranking" is linked to a "top reviewers" page or page which display top ranked reviewers. The "top reviewers" page is discussed in greater detail below with reference to FIG. 6.

Figure 5:
FIG. 5 illustrates an example review entry page.

Activating the "write an online review" link causes the example customer review entry form illustrated in FIG. 5 to be displayed. The form includes an image of the product being reviewed, a rating entry field, a title field, and a review text field. In this example, the rating field is implemented as a drop down menu which allows the customer to give a 1-5 star rating of the item being reviewed. The review title field allows the customer to give a brief title for the customer's review. The review text field is used to received a textual review. The length of the review may be limited. In this example, the review is limited to 1,000 words, though other limitations may be used.

As illustrated in FIG. 5, the customer can specify whether the customer's public nickname is to be displayed in association with the review, or whether the review is to be displayed anonymously, that is, without the customer's nickname. The customer can also specify the customer's geographical location, including city, state and country information. In this embodiment, the customer's geographical location is displayed in association with the review even when the review is designated as anonymous. An "I own it" field allows the reviewer to indicate whether or not. the reviewer owns the item being reviewer.

Figure 6:
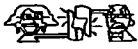
FIG. 6 illustrates an example page listing reviewers having selected rankings.

FIG. 6 illustrates an example page listing reviewers having selected rankings. For example, the top or ranked reviewers pages may display information on the top 1,000 reviewers, including their names or nicknames, all or excerpts of their personal descriptions, and optionally, a photo or image associated with a corresponding reviewer. A tally of the number of reviews authored by the reviewers is also provided. The name of each ranked reviewer is linked to their profile page, where readers can view the reviewer's profile information designated as public. In addition, the "more" text following each personal description excerpts also includes a link to the corresponding profile page.

Figure 7:
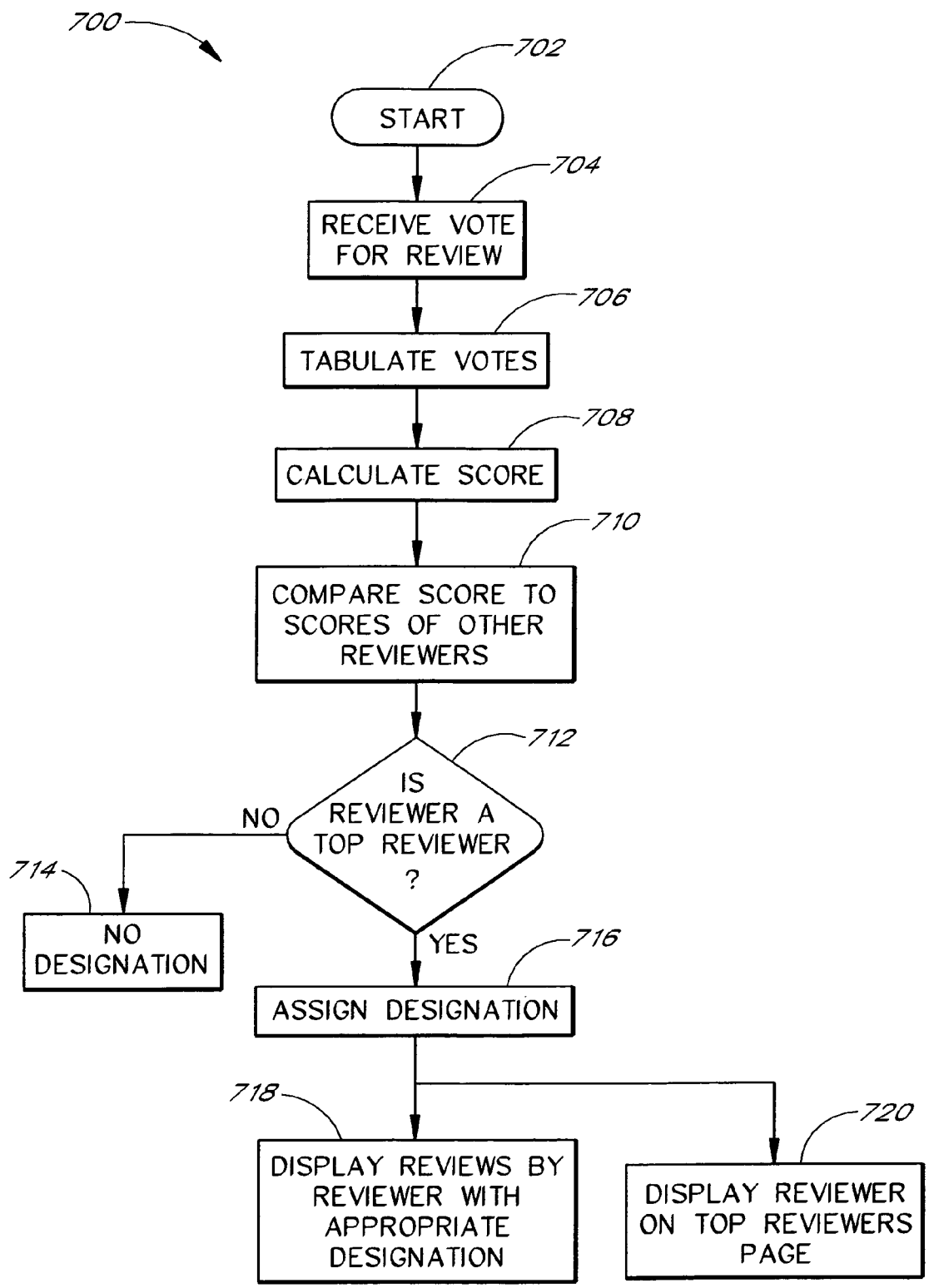
FIG. 7 illustrates an example online process for receiving, processing, and presenting evaluations for reviews of the type shown in FIG. 4.

FIG. 7 illustrates an example online process 700 for receiving, processing, and presenting evaluations for reviews of the type illustrated in FIG. 4. Beginning at state 702, the process proceeds to state 704. An evaluation in the form of a "helpful"

or "not helpful" vote or the like is received. At state 706, the received vote is tabulated with previous votes received for the review. Based on the tabulated votes, at state 708 a review score is calculated for display with the review. At state 710, the reviewer's the vote is also tabulated with votes for other reviews by the reviewer and a reviewer score is calculated. At state 712 the reviewer's score is compared with that of other reviewers. Based on the comparison of the reviewer's score with the scores of others, at state 714 a determination is made as to whether the reviewer has reached a certain stature as a reviewer, that is, whether the reviewer is a "top" reviewer as defined by the review system. If the reviewer is not entitled to such as designation, then the process 700 proceeds to state 716, and no ranking designation is provided. Otherwise, the process 700 proceeds to state 718 where the appropriate designation is assigned to the reviewer based on the comparison performed at state 712. By way of example, the designation may be "Top 100 Reviewer." At state 720, the review is displayed is association with the reviewed item on a product information page, wherein the reviewer's designation is displayed in conjunction with the review. At state 722, the reviewer's name is displayed on a "top reviewers" page, such as that illustrated in FIG. 6.

Figure 8:
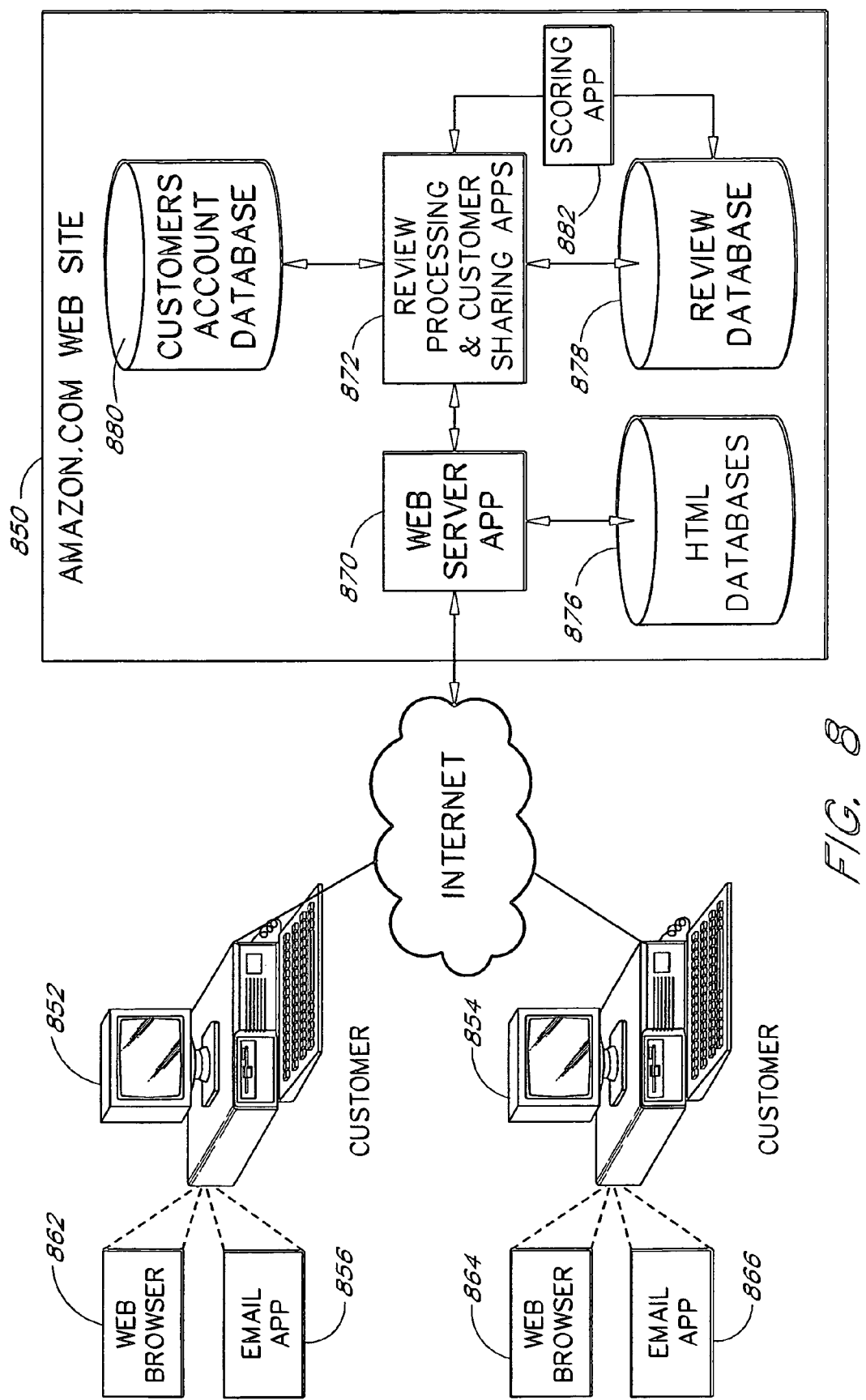
FIG. 8 is an architectural schematic illustrating an exemplary set of components which may be used to implement the customer profile form, customer reviews, rating of customer reviews, rating of reviewers, and personal purchase circles.

FIG. 8 illustrates an exemplary commerce system, including software and hardware components for implementing a review processing and customer information sharing system in accordance with one embodiment of the invention and illustrates typical user components for accessing the system. As depicted by this drawing, customers access the Web site 850 using respective personal computers 852, 854 or other general-purpose computers, terminals, or clients that have access to the Internet. The customers may alternatively access the Web site 850 using special purpose devices. The customer computers 852, 854 may run commercially-available Web browser applications 862, 864 such as Microsoft Internet Explorer® or Netscape Navigator®, which implement the basic World Wide Web standards such as HTTP and HTML.

The computers 852, 854 may also run a commercially available e-mail application 856, 866, such as Microsoft Outlook® or Netscape Navigator®, which may be used to receive communications from the merchant-related Web site 550. For example, the e-mail application 856, 866 may be used to receive gift reminders, as previously described. The e-mail applications 856, 866 and the browsers 862, 864 may be integrated with one another, and/or may be integrated with other application programs or the operating system.

In the embodiment described herein, the Web site 850 includes a computer system and associated content that are accessible via the Internet. The Web site 850 may optionally include content that spans multiple Internet domains, and/or may be implemented using physical servers that are geographically remote from one another. In other embodiments, the Web site 850 may be in the form of an intranet site, in which case the computers 852, 854 may be coupled to the site solely by a private network. For example, Web site 850 may be in the form of an internal corporate store site for company employees.

In other embodiments, the Web site 850 may be replaced with another type of network site. For example, the various services described herein could alternatively be implemented on a hypertextual site or browsing area of an online services network such as America Online® or MSN®, or using interactive TV, in which case users may access the site using software that implements non-standard document formats and transfer protocols.

As further depicted by FIG. 8, the Web site 850 includes a commercially-available Web server application 870. The Web server application 870 accesses an HTML and products database 876 used to generate Web pages in response to the actions of end users. Various other back-end components (not shown) are also used for this purpose.

The Web site 850 also includes review processing and customer information sharing applications 872 which includes the basic functionality for receiving customer reviews and review evaluations, as well as for processing user instructions relating to the sharing of customer purchase information and other private information, as previously discussed. The review processing and customer information sharing applications 872 access a review database 878 and a customer account database 880. The review database 878 stores customer and professional reviews, pointers to the corresponding items being reviewed, and evaluations associated with the customer reviews. The customer account database 880 includes information used to populate the customer's profile page, including the customer's name, nickname, e-mail address, reviewer ranking, if any, purchase history, and an indication as to which items of information are designated as private and which are designated as public, and who may be view selected private information.

The scoring application 882 calculate scores for reviews and customer reviewers. As previously discussed, the scores may be based on the number of "helpful" votes a review received and/or the number of "not helpful" votes received. The scoring is used by the review processing application 872 to rank reviewers based on a tally of scores received for some or all of the reviewers written by a given customer. The score for each review is also stored in association with the review in the review database 880.

Figure 9A:
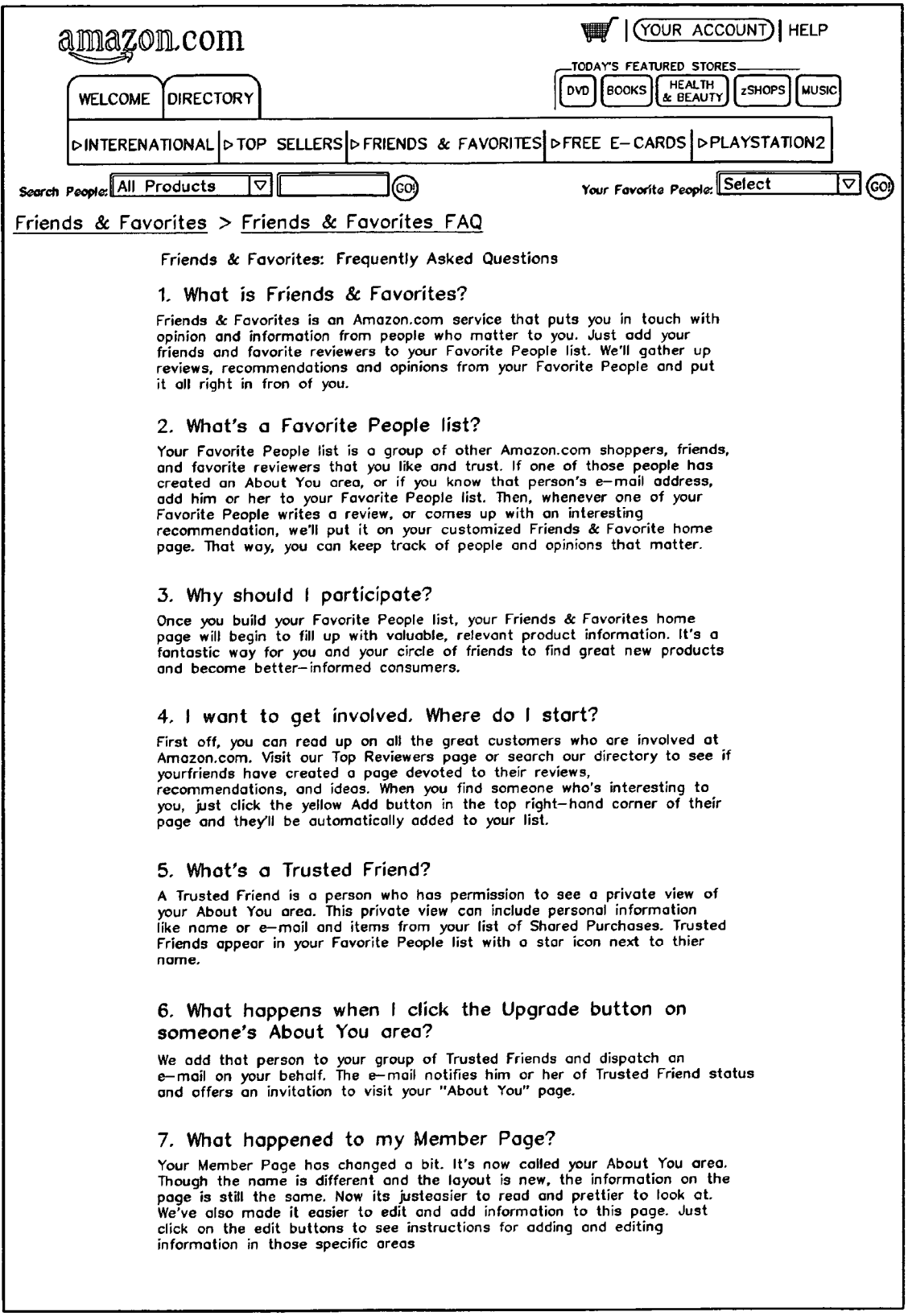

As discussed above, a customer can optionally specify that information on selected purchases is to be shared with others. Further, the customer can optionally specify with whom the purchase information is to be shared with. FIGS. 9A-C illustrate an explanation page that explains, for one embodiment, the different statuses that can be assigned by one customer to another customer and how those statuses are assigned. For example, a person can be designated as a "trusted friend," that is, someone who has permission to view private areas of the customer's profile or "about you" page and information on the customer's purchases. Additionally, as previously discussed, a customer can designate a person as a "favorite person," that is, someone whose reviews the customer is particularly interested in. Reviews authored by a designated favorite person or placed on a page customized for the customer.

FIGS. 10A-B illustrate an example customer purchase sharing page for specifying for which of a customer's purchases is information to be shared with designated others. The page or pages lists items purchased made by the customer. In association with each item is a review field and a rating field. The customer may enter a review for the item into the review field. For example, for an animated film the customer may enter the comment "cutting edge animation." In addition or instead, the customer can provide a point rating, such as a rating on a scale of 1 to 5, by activating the appropriate number in the rating field, which will then be marked with a dot, checkmark or the like. Otherwise, a "?" field will be marked, indicating no numerical rating has been provided.

FIG. 11A illustrates an example page used by a customer to specify who may view the customer's purchase sharing page. The customer may specify who is authorized to view the customer's purchase sharing page by entering their e-mail address into an e-mail field. In this example, the e-mail address is to a johndoe@example. An invitation, such as that illustrated in FIG. 12, is then e-mailed to the specified e-mail address. The invitation notifies the invitee that he or she has been added to the customer's list of those authorized to view private information on the customer's profile page and information on the customer's purchases. In addition, a link to the customer's profile page is provided so that the invitee can activate the link and the profile page will be displayed on the invitee's computer browser.

FIG. 11B illustrates an example page used by a customer to change the status of another user with respect the customer and to display who has been invited to view the customer's purchase sharing page but has not responded. Thus, for example, the customer can designate a listed person as a "trusted friend," that is, someone who is authorized to view the customer's purchase information, or can designate the listed person as a "favorite people," that is, as previously discussed, someone whose reviews the customer is particularly interested in, or can delete the listed person as a "favorite person" or "trusted friend." The illustrated page lists who has not responded to the customer's invitation to become a trusted friend and allows the customer to request that another invitation to e-mailed to the non-responsive person. The customer can also specify that the customer does not want to receive an e-mail notification each time the customer is designated by another as a "trusted friend."

Thus the present invention provides a review processing system that helps customers select which items to purchase by customer-authored product reviews. Further, customers can rate product reviews, thereby identifying which reviews are useful and which reviewers tend to provide more useful reviews, thereby allowing customers to efficiently locate helpful reviews. To further provide helpful customer generated shopping information, customers can selectively share information regarding purchases with friends, family, and others.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A method of evaluating a product review displayed in connection with a networked commerce site, comprising:
    providing, via a system comprising at least one physical computer, a product review authored by a first customer over a network to a plurality of other customers;
    receiving, at the system, votes over the network from other customers indicating whether the product review was helpful, wherein the votes comprise votes indicating that the product review is helpful and votes indicating that the product review is not helpful;
    tallying, by the system, the votes received for the product review, wherein the helpful votes are weighted differently than non-helpful votes;
    providing via the system over the network an indication related to the vote tally for the product review in association with the product review;
    tallying, by the system, votes received for a plurality of reviews authored by the first customer to provide a total tally, the total tally including votes received for the product review;
    assigning, using the system, a designation to the first customer based on the total vote tally for the plurality of reviews authored by the first customer; and
    providing over the network for display the designation in association with the product review.

2. The method as defined in claim 1, further comprising providing over the network for display a ranking in association with a plurality of the first customer's reviews, wherein the ranking is based at least in part on the vote tally.

3. The method as defined in claim 2, wherein the ranking is determined by the number of helpful and unhelpful votes received for one or more of the first customer's reviews.

4. The method as defined in claim 2, further comprising rewarding the first customer at least partly in response to the first customer achieving a first ranking.

5. The method as defined in claim 1, further comprising providing over the network for display the designation in association with a plurality of reviews authored by the first customer.

6. The method as defined in claim 1, further comprising preventing a vote on the product review from the first customer from being included in the tally of votes received for the product review.

7. The method as defined in claim 1, wherein each of the other customers is prevented from voting more than once in relation to the product review.

8. The method as defined in claim 1, further comprising generating a profile page associated with the first customer, wherein the profile page includes an indication related to the number of helpful votes the first customer has received for a plurality of reviews authored by the customer.

9. The method as defined in claim 1, further comprising generating a profile page associated with the first customer, wherein the profile page includes the number of unhelpful votes the first customer has received.

10. A method of evaluating a product review displayed in connection with a networked commerce site, comprising:
    providing, via a system comprising at least one physical computer, a product review authored by a first customer over a network to a plurality of other customers;
    receiving, at the system, votes over the network from other customers indicating whether the product review was helpful, wherein the votes comprise votes indicating that the product review is helpful and votes indicating that the product review is not helpful;
    tallying, by the system, the votes received for the product review;
    providing via the system over the network an indication related to the vote tally for the product review in association with the product review;
    tallying, by the system, votes received for a plurality of reviews authored by the first customer to provide a total tally, the total tally including votes received for the product review;
    assigning, using the system, a designation to the first customer based on the total vote tally for the plurality of reviews authored by the first customer;
    providing over the network for display the designation in association with the product review; and
    providing over the network for display a ranking in association with a plurality of the first customer's reviews, wherein the ranking is based at least in part on the vote tally.

11. The method as defined in claim 10, wherein the helpful votes are weighted differently than non-helpful votes.

12. The method as defined in claim 10, providing over the network for display a ranking in association with a plurality of the first customer's reviews, wherein the ranking is based at least in part on the vote tally.

13. The method as defined in claim 10, wherein the ranking is determined by the number of helpful and unhelpful votes received for one or more of the first customer's reviews.

14. The method as defined in claim 10, further comprising rewarding the first customer at least partly in response to the first customer achieving a first ranking.

15. The method as defined in claim 10, further comprising providing over the network for display the designation in association with a plurality of reviews authored by the first customer.

16. The method as defined in claim 10, further comprising preventing a vote on the product review from the first customer from being included in the tally of votes received for the product review.

17. The method as defined in claim 10, wherein each of the other customers is prevented from voting more than once in relation to the product review.

18. The method as defined in claim 10, further comprising generating a profile page associated with the first customer, wherein the profile page includes an indication related to the number of helpful votes the first customer has received for a plurality of reviews authored by the customer.

19. The method as defined in claim 10, further comprising generating a profile page associated with the first customer, wherein the profile page includes the number of unhelpful votes the first customer has received.

* * * * *

UNITED STATES PATENT AND TRADEMARK OFFICE
CERTIFICATE OF CORRECTION

PATENT NO. : 7,664,669 B1  Page 1 of 1
APPLICATION NO. : 09/715929
DATED : February 16, 2010
INVENTOR(S) : Warren Adams et al.

It is certified that error appears in the above-identified patent and that said Letters Patent is hereby corrected as shown below:

Title page, (Item 54), Page 1, Title, and column 1, lines 1-3, Change "METHODS AND SYSTEMS FOR DISTRIBUTING INFORMATION WITHIN A DYNAMICALLY DEFINED COMMUNITY" to --METHODS AND SYSTEMS FOR PROCESSING DISTRIBUTED FEEDBACK--.

Title page, Item (*) Notice:   should read as follows:   Subject to any disclaimer, the term of this patent is extended or adjusted under 35 U.S.C 154(b) by 2451 days.

Title page, (Item 56), Page 2, Col. 2, line 1, Under Other Publications, change ""Companies" to --"10 Companies--.

Title page, (Item 56), Page 2, Col. 2, lines 39-40, Under Other Publications, below "archive.org." delete "Epinions.com, www.epinions.com, Dec. 4, 1999[retrieved May 17, 2004], pp. 1021, retrieved from: Google.com and archive.org.".

Column 8, line 53, Change "page" to --page.--.

Column 18, line 50, After "not." change "the" to --The--.

Signed and Sealed this

Thirty-first Day of August, 2010

David J. Kappos
*Director of the United States Patent and Trademark Office*